United States Patent
Kroymann et al.

(10) Patent No.: US 10,246,158 B2
(45) Date of Patent: Apr. 2, 2019

(54) ACTUATED ACCESSORY FOR A SELF-BALANCING BOARD

(71) Applicant: YVOLVE SPORTS LTD., Dublin (IE)

(72) Inventors: Tyler Kroymann, Palo Alto, CA (US); Colm Marum, Dublin (IE); Barry Ryan, Dublin (IE); Wayne Walsh, Shankill (IE)

(*) Notice: Subject to any disclaimer, the term of this patent is extended or adjusted under 35 U.S.C. 154(b) by 0 days.

(21) Appl. No.: 16/038,151

(22) Filed: Jul. 17, 2018

(65) Prior Publication Data
US 2018/0319455 A1    Nov. 8, 2018

Related U.S. Application Data

(63) Continuation-in-part of application No. 15/633,722, filed on Jun. 26, 2017, now Pat. No. 10,023,259, (Continued)

(51) Int. Cl.
*B62K 5/027*    (2013.01)
*B62K 13/04*    (2006.01)
(Continued)

(52) U.S. Cl.
CPC .......... *B62K 13/04* (2013.01); *A63C 17/0013* (2013.01); *A63C 17/011* (2013.01); (Continued)

(58) Field of Classification Search
CPC ...... B62K 13/04; B62K 11/007; B62K 21/12; B62K 19/30; B62K 23/06; B62J 1/08; (Continued)

(56) References Cited

U.S. PATENT DOCUMENTS 4,386,794 A    6/1983    Roberts
7,635,037 B2    12/2009    Treadwell et al.
(Continued)

FOREIGN PATENT DOCUMENTS

CN    2592496 Y    12/2003
CN    2709297 Y    7/2005
(Continued)

OTHER PUBLICATIONS

Hoverseat, LLC, "Handles for Manual Operation of Hoverboard", www.hoverseat.us, retrieved Nov. 29, 2016.
(Continued)

*Primary Examiner* — Brian L Swenson
(74) *Attorney, Agent, or Firm* — Millman IP Inc.

(57) ABSTRACT

Provided is an accessory for a self-balancing board having two lateral foot-deck ends, each being coupled to a motor that drives a wheel in response to its orientation. The foot-deck has at least one sensor that is triggered when a rider is in a riding position thereon. The accessory includes a chassis, at least one travel surface-contacting element, a seat, and an engagement structure that releasably engages the self-balancing board. At least one sensor-triggering element is actuatable between an idle position and a triggering position, wherein the at least one sensor-triggering element triggers the at least one sensor. At least one control member actuates at least one of the engagement structure and the at least one sensor-triggering element to control the orientation of the lateral foot-deck ends. At least one manually actuatable actuator actuates the at least one sensor-triggering element between the idle position and the triggering position.

18 Claims, 18 Drawing Sheets

Related U.S. Application Data which is a continuation of application No. 15/423,564, filed on Feb. 2, 2017, now Pat. No. 9,688,340.

(60) Provisional application No. 62/290,704, filed on Feb. 3, 2016.

(51) Int. Cl.

| | | |
|---|---|---|
| *B62K 11/00* | (2006.01) | |
| *B62J 1/08* | (2006.01) | |
| *B62K 21/12* | (2006.01) | |
| *B62K 19/30* | (2006.01) | |
| *B62K 19/36* | (2006.01) | |
| *B62K 23/06* | (2006.01) | |
| *B62K 5/02* | (2013.01) | |
| *A63C 17/00* | (2006.01) | |
| *A63C 17/01* | (2006.01) | |
| *A63C 17/12* | (2006.01) | |
| *A63C 17/26* | (2006.01) | |
| *A63C 17/28* | (2006.01) | |

(52) U.S. Cl.
CPC ............ *A63C 17/014* (2013.01); *A63C 17/12* (2013.01); *A63C 17/265* (2013.01); *A63C 17/28* (2013.01); *B62J 1/08* (2013.01); *B62K 5/02* (2013.01); *B62K 11/007* (2016.11); *B62K 19/30* (2013.01); *B62K 19/36* (2013.01); *B62K 21/12* (2013.01); *B62K 23/06* (2013.01); *A63C 2203/12* (2013.01); *A63C 2203/24* (2013.01); *A63C 2203/40* (2013.01); *A63C 2203/52* (2013.01)

(58) Field of Classification Search
CPC .... A63C 17/0013; A63C 17/265; A63C 17/28
See application file for complete search history.

(56) References Cited

U.S. PATENT DOCUMENTS

| | | |
|---|---|---|
| 7,647,999 B2 | 1/2010 | Geiser |
| 8,201,653 B2 | 6/2012 | Strassman |
| 8,424,628 B1 | 4/2013 | Schade |
| 8,738,278 B2 | 5/2014 | Chen |
| 9,403,573 B1 | 8/2016 | Mazzei et al. |
| 9,604,692 B1 | 3/2017 | Kim |
| 2007/0131461 A1 | 6/2007 | Treadwell |
| 2009/0115149 A1 | 5/2009 | Wallis et al. |
| 2010/0025139 A1 | 2/2010 | Kosaka |
| 2010/0117426 A1 | 5/2010 | Strassman |
| 2010/0237645 A1 | 9/2010 | Trainer |
| 2011/0303475 A1 | 12/2011 | Kim |
| 2013/0062857 A1 | 3/2013 | Winter et al. |
| 2014/0008138 A1 | 1/2014 | Kim |
| 2014/0091543 A1 | 4/2014 | Menard et al. |
| 2015/0008051 A1 | 1/2015 | Halsall |
| 2015/0353158 A1 | 12/2015 | Chang |
| 2016/0325803 A1 | 11/2016 | Waxman et al. |
| 2017/0151995 A1 | 6/2017 | Chen |

FOREIGN PATENT DOCUMENTS

| | | |
|---|---|---|
| CN | 1872614 A | 12/2006 |
| CN | 204452722 U | 7/2015 |
| CN | 104859773 A | 8/2015 |
| CN | 105000107 A | 10/2015 |
| EP | 2713982 A1 | 4/2014 |
| KR | 100789906 B1 | 1/2008 |
| WO | 2012017335 A1 | 2/2012 |

OTHER PUBLICATIONS

Hoverbars LLC, "Enhance your stance", www.hoverbars.com, retrieved Nov. 29, 2016.
PCT/US2017/016305, International Search Report & Written Opinion, USPTO, Apr. 28, 2017.
Inflatable Boats, "Hoverboard Sitting Attachments. Ride in Comfort!", https://www.youtube.com/watch?=pJL6V3h9-Qg, Jan. 14, 2016, retrieved Aug. 28, 2017.
EP 17724309, Supplementary European Search Report, dated Dec. 5, 2017, European Patent Office.
ZL2017201067633, Evaluation Report of Utility Model Patent, Chinese State Intellectual Property Office, Dec. 27, 2017.
EP 18166757.7, Extended European Search Report, Nov. 8, 2018, European Patent Office.

ACTUATED ACCESSORY FOR A SELF-BALANCING BOARD

CROSS-REFERENCE TO RELATED APPLICATIONS

This application is a continuation-in-part application of U.S. patent application Ser. No. 15/633,722, filed Jun. 26, 2017, which is a continuation of U.S. patent application Ser. No. 15/423,564, filed on Feb. 2, 2017, which claims priority from U.S. Provisional Patent Application Ser. No. 62/290,704, filed Feb. 3, 2016, the contents of all of which are incorporated herein by reference in their entirety.

FIELD

The specification relates generally to powered personal transportation devices. In particular, the following relates to an actuated accessory for a self-balancing board.

BACKGROUND OF THE DISCLOSURE

Self-balancing boards are well known in the industry. Such self-balancing boards, however, require considerable effort and skill for a rider to safely balance themselves while riding such boards. In addition, instability is inherent and thus a closed-loop feedback control system is required in order to maintain balance. This means that, if at any moment, the control effort is inadequate, the rider can easily fall from the vehicle. This can be the result of a malfunction of the vehicle, or by the rider providing an extreme, inadequate, or over input, such as a lean angle that would result in an output (such as a desired wheel torque or speed) that is beyond the capability of the vehicle or the rider's ability to self-balance on the self-balancing board. In either case, if the output required to maintain balance is not achievable, the rider will likely fall, potentially causing injuries to themselves or others, or property damage. When the rider does fall, the risk of bodily injury is high due to the height of the standing user from the ground. There have been numerous documented incidents where riders have fallen off of self-balancing boards, leading to injuries that range from minor scrapes all the way to broken bones and concussions.

SUMMARY OF THE DISCLOSURE

In one aspect, there is provided an actuated accessory for a self-balancing board comprising a foot-deck having two lateral foot-deck ends, each lateral foot-deck end being coupled to a motor that drives a wheel in response to an orientation of the lateral foot-deck end relative to a horizontal plane, the foot-deck having at least one sensor that is triggered when a rider is in a riding position thereon, the accessory comprising: a chassis; at least one travel surface-contacting element coupled proximal to a first longitudinal end of the chassis to facilitate travel of the chassis over a travel surface; a seat coupled to the chassis and configured to support a rider; an engagement structure that releasably engages the self-balancing board and fails to trigger the at least one sensor; at least one sensor-triggering element that is actuatable relative to the engagement structure between an idle position, wherein the at least one sensor-triggering element fails to trigger the at least one sensor, and a triggering position, wherein the at least one sensor-triggering element triggers the at least one sensor; at least one control member coupled to and actuating at least one of the engagement structure and the at least one sensor-triggering element to control the orientation of the lateral foot-deck ends relative to a horizontal plane; and at least one actuator coupled to the at least one sensor-triggering element, the at least one actuator being manually actuatable by the rider when the rider is in the seat to actuate the at least one sensor-triggering element between the idle position and the triggering position.

Each of at least one actuator can be positioned towards a distal end of a corresponding one of the at least one control member. The actuator can actuate a corresponding one of the at least one sensor-triggering element when the actuator is moved towards the corresponding one of the at least one control member. The actuator can be coupled to a cable that actuates the corresponding one of the at least one sensor-triggering element. The cable can be coupled to a positioning member to which the corresponding one of the at least one sensor-triggering element is coupled, wherein tensioning of the cable by the actuator causes the positioning member to pivot to move the corresponding one of the at least one sensor-triggering element from the idle position towards the triggering position. The positioning member can be biased to pivot to move the corresponding one of the at least one sensor-triggering element towards the idle position. The actuator can pivot about an actuator pivot axis towards the corresponding one of the at least one control member to tension the cable. The cable can be coupled to the positioning member via a resiliently deformable member that deforms when the corresponding one of the at least one sensor-triggering element abuts a corresponding one of the at least one sensor and tension is applied to the cable by the actuator. The resiliently deformable member can be a coil spring.

Each of the at least one actuator can be lockable so that a corresponding one of the at least one sensor-triggering element is fixed in the triggering position.

In another aspect, there is provided an actuated accessory for a self-balancing board, the self-balancing board comprising a foot-deck having two lateral foot-deck ends, each lateral foot-deck end being coupled to a motor that drives a wheel in response to an orientation of the lateral foot-deck end relative to a horizontal plane, the foot-deck having at least one sensor that is triggered when a rider is in a riding position thereon, the accessory comprising: a chassis; an engagement structure that releasably engages the self-balancing board and fails to trigger the at least one sensor; at least one sensor-triggering element that is actuatable relative to the engagement structure between an idle position, wherein the at least one sensor-triggering element fails to trigger the at least one sensor, and a triggering position, wherein the at least one sensor-triggering element triggers the at least one sensor; at least one control member coupled to and actuating at least one of the engagement structure and the at least one sensor-triggering element to control the orientation of the lateral foot-deck ends relative to a horizontal plane; and at least one actuator coupled to the at least one sensor-triggering element, the at least one actuator being manually actuatable by the rider to actuate the at least one sensor-triggering element between the idle position and the triggering position.

The actuator can be coupled to a cable that actuates the corresponding one of the at least one sensor-triggering element. The cable can be coupled to a positioning member to which the corresponding one of the at least one sensor-triggering element is coupled, wherein tensioning of the cable by the actuator causes the positioning member to pivot to move the corresponding one of the at least one sensor-triggering element from the idle position towards the triggering position. The positioning member can be biased to pivot to move the corresponding one of the at least one sensor-triggering element towards the idle position. The actuator can pivot about an actuator pivot axis towards the corresponding one of the at least one control member to tension the cable. The cable can be coupled to the positioning member via a resiliently deformable member that deforms when the corresponding one of the at least one sensor-triggering element abuts a corresponding one of the at least one sensor and tension is applied to the cable by the actuator. The resiliently deformable member can be a coil spring.

Each of the at least one actuator can be lockable so that a corresponding one of the at least one sensor-triggering element is fixed in the triggering position.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
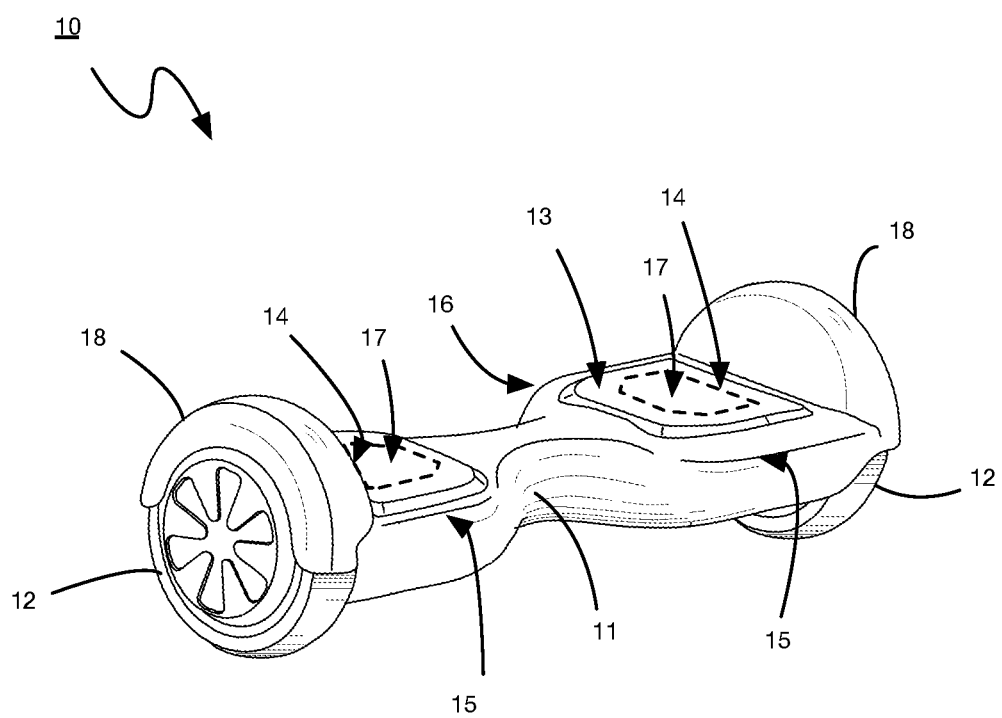
FIG. 1 is a perspective view of one type of a self-balancing board.
Figure 2A:
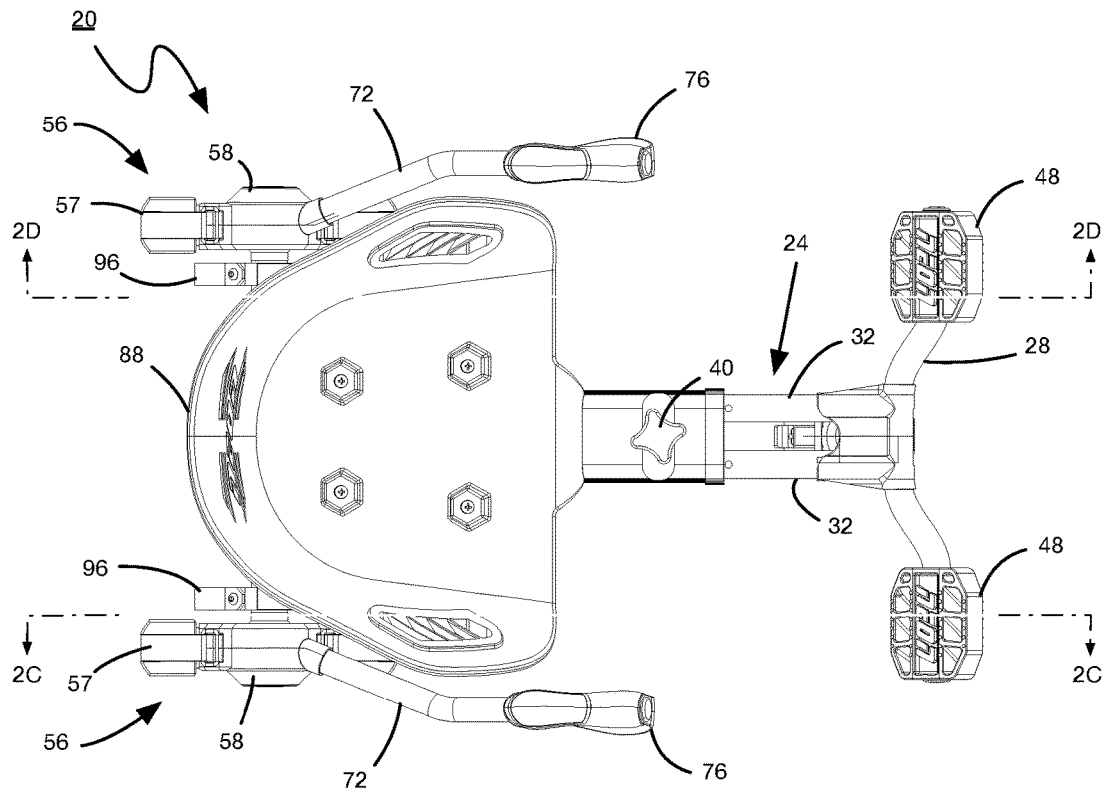
FIG. 2A is a top view of an accessory for the self-balancing board of FIG. 1 in accordance with an embodiment.
Figure 2B:
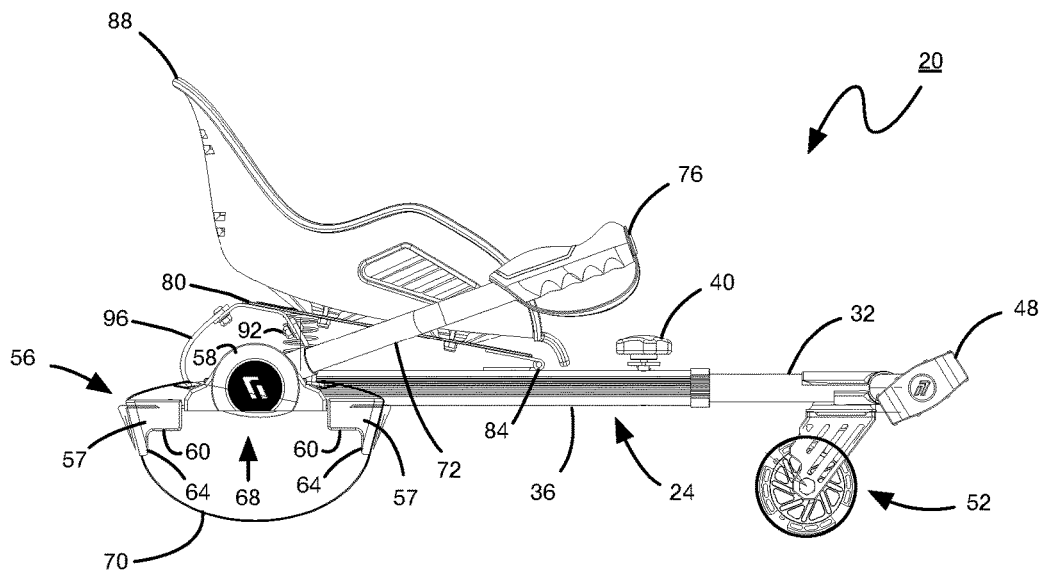
FIG. 2B is a side view of the accessory of FIG. 2A.
Figure 2C:
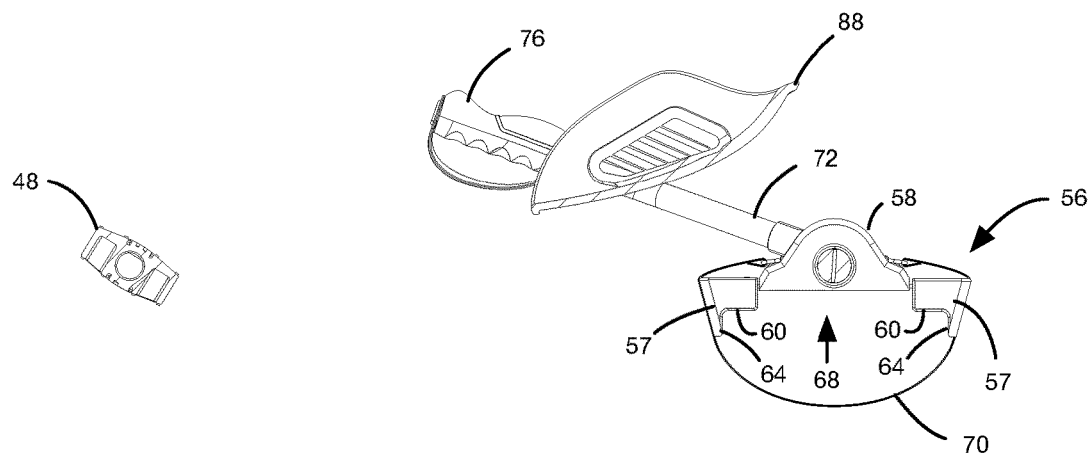
FIG. 2C is section view of the accessory of FIG. 2A along the line 2C-2C.
Figure 2D:
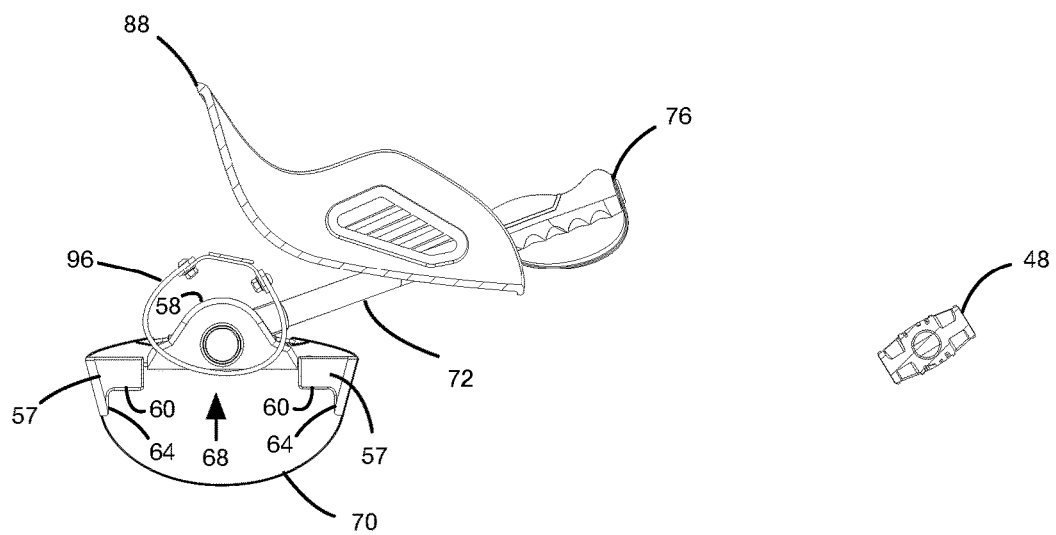
FIG. 2D is section view of the accessory of FIG. 2A along the line 2D-2D.
Figure 2E:
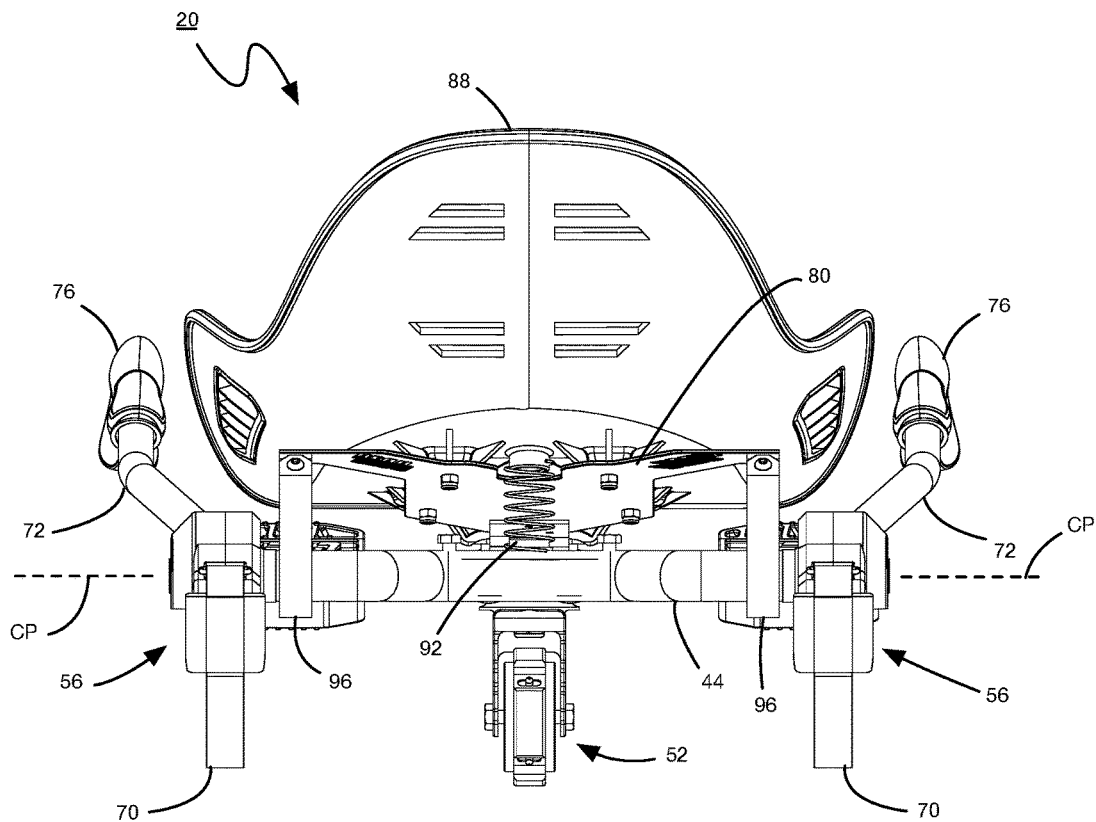
FIG. 2E is a rear view of the accessory of FIG. 2A.
Figure 2F:
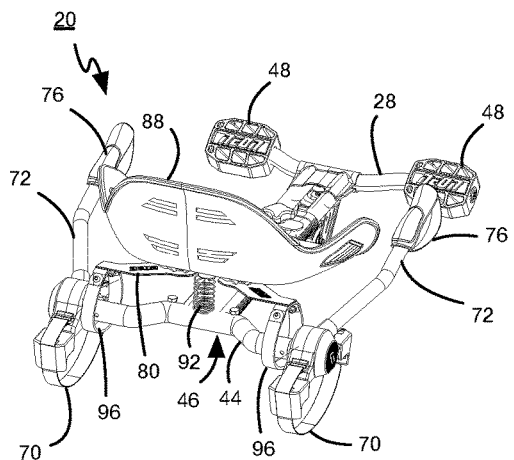
FIG. 2F is a rear perspective view of the accessory of FIG. 2A.
Figure 2G:
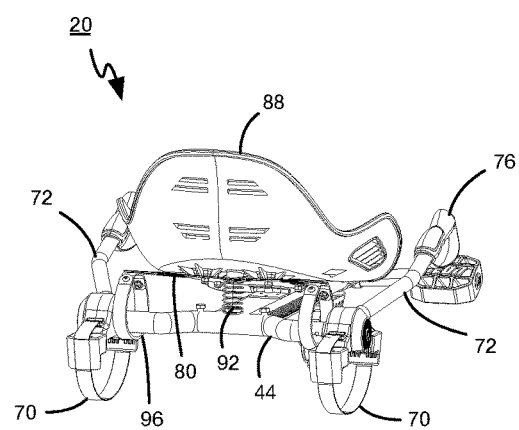
FIG. 2G is another rear perspective view of the accessory of FIG. 2A.
Figure 3A:
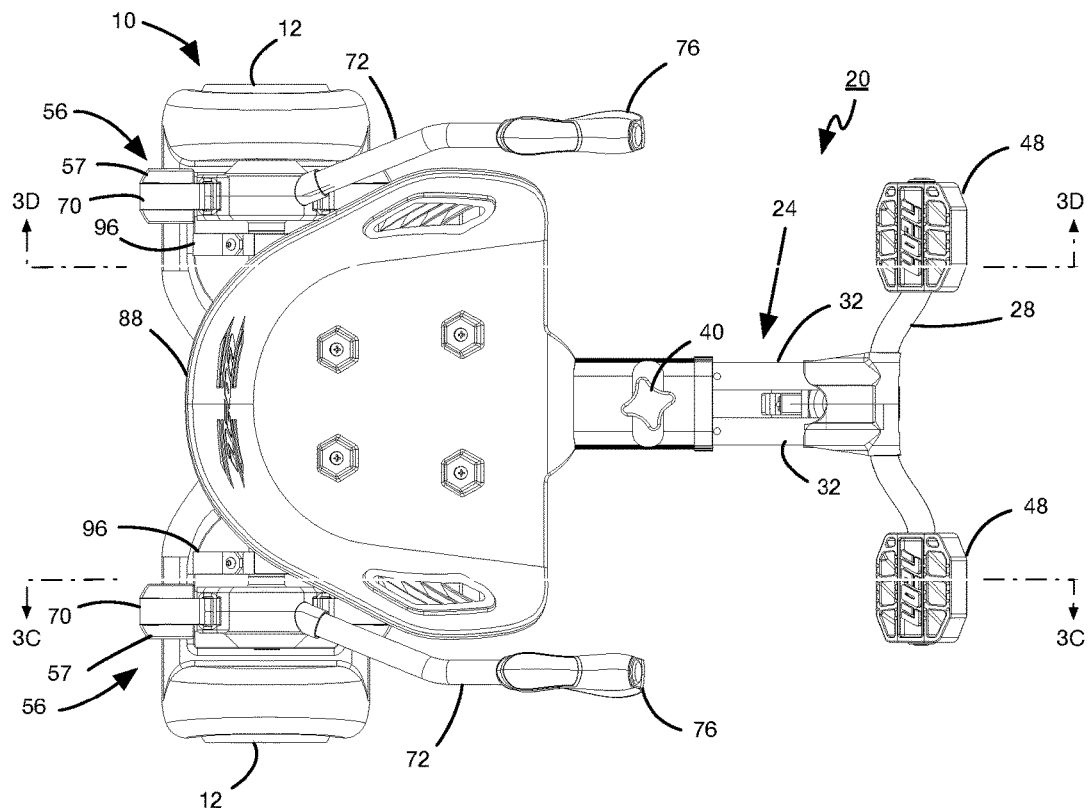
FIG. 3A is a top view of the accessory of FIG. 2A secured to the self-balancing board of FIG. 1.
Figure 3B:
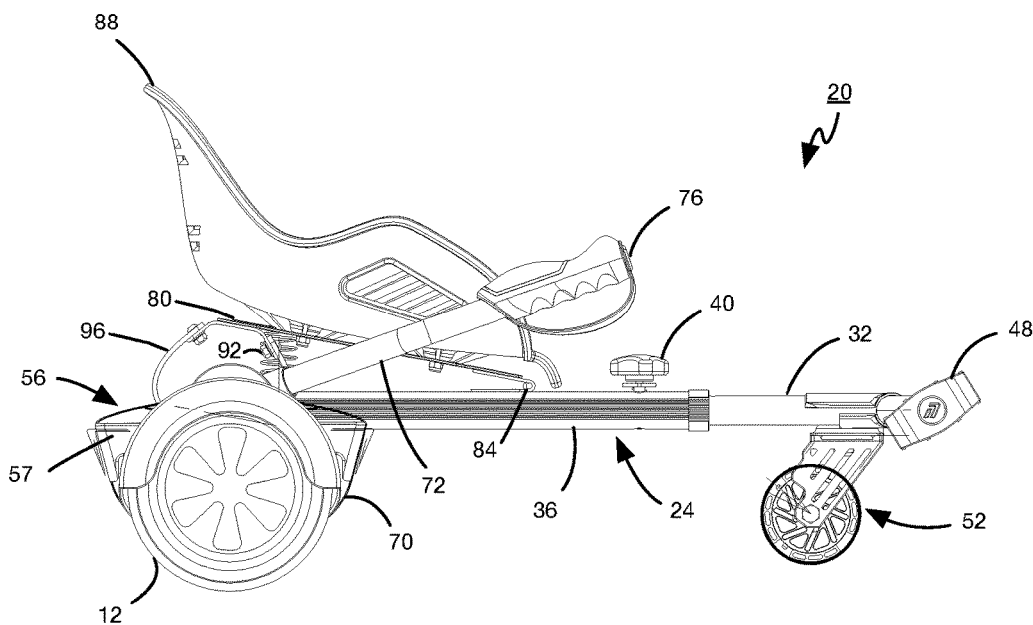
FIG. 3B is a side view of the accessory of FIG. 2A secured to the self-balancing board of FIG. 1.
Figure 3C:
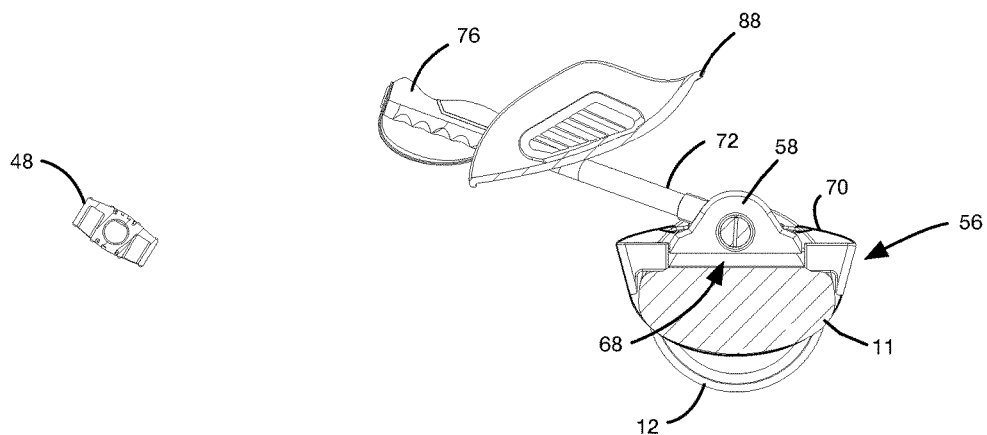
FIG. 3C is section view of the accessory and the self-balancing board of FIG. 3A along the line 3C-3C.
Figure 3D:
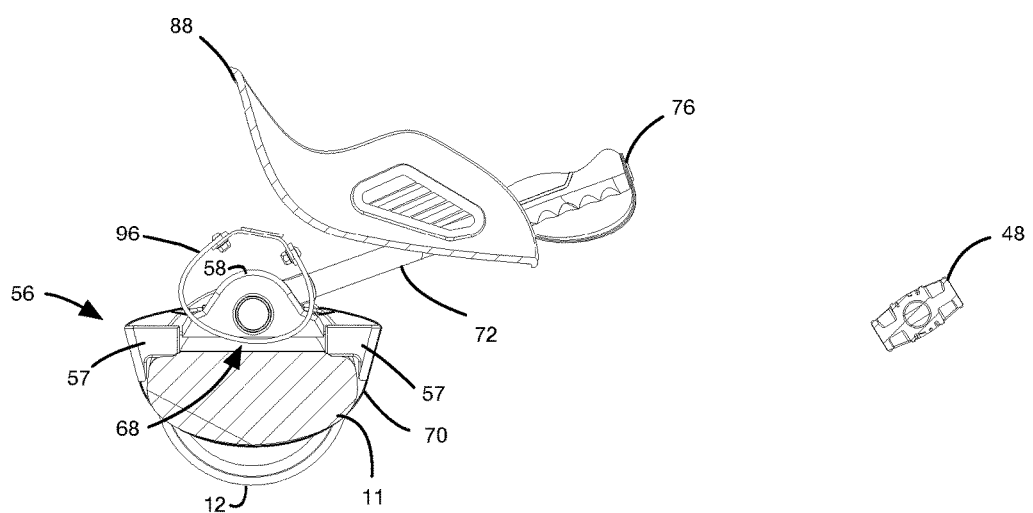
FIG. 3D is section view of the accessory and the self-balancing board of FIG. 3A along the line 3D-3D.
Figure 3E:
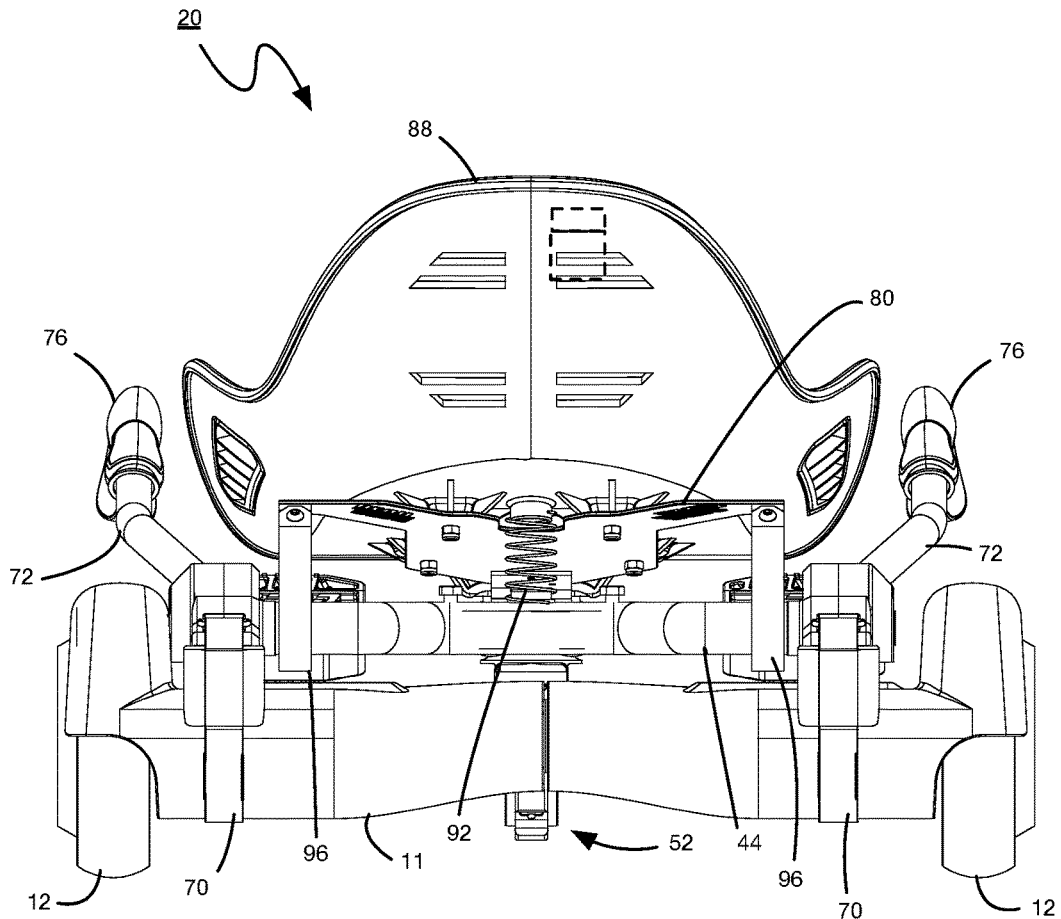
FIG. 3E is a rear view of the accessory of FIG. 2A secured to the self-balancing board of FIG. 1.
Figure 3F:
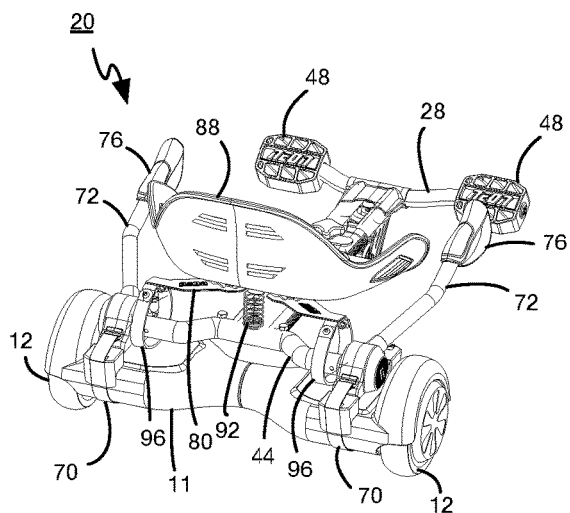
FIG. 3F is a rear perspective view of the accessory of FIG. 2A secured to the self-balancing board of FIG. 1.
Figure 3G:
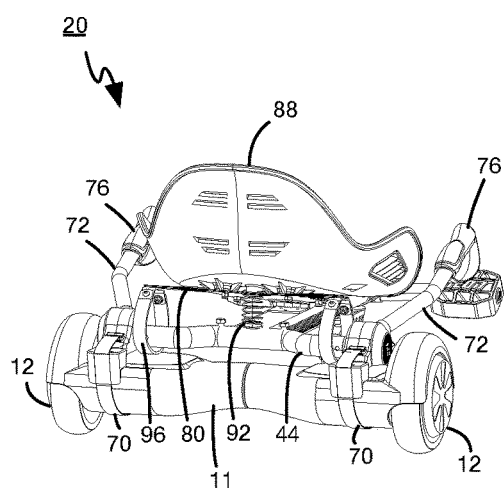
FIG. 3G is another rear perspective view of the accessory of FIG. 2A secured to the self-balancing board of FIG. 1.
Figure 4A:
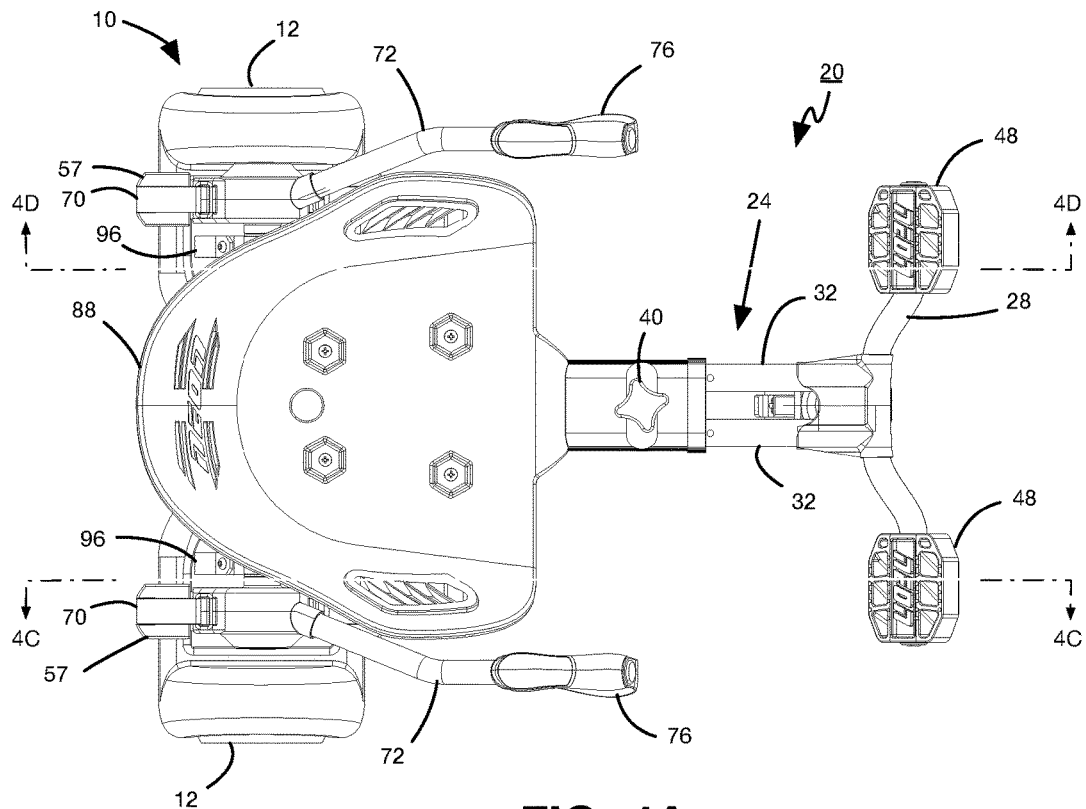
FIG. 4A is a top view of the accessory of FIG. 2A secured to the self-balancing board of FIG. 1 after biasing of the seat towards the self-balancing board.
Figure 4B:
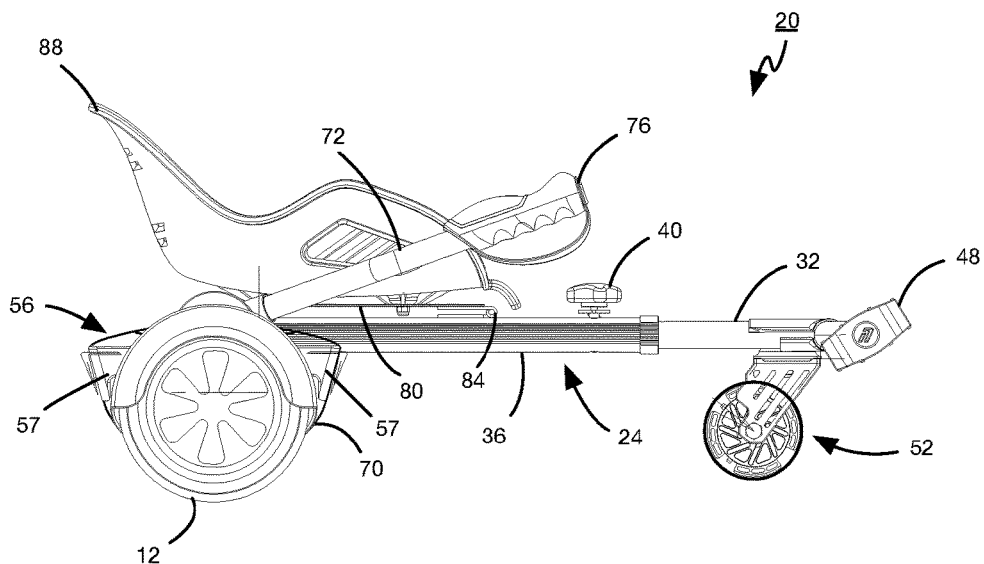
FIG. 4B is a side view of the accessory of FIG. 2A secured to the self-balancing board of FIG. 1 after biasing of the seat towards the self-balancing board.
Figure 4C:
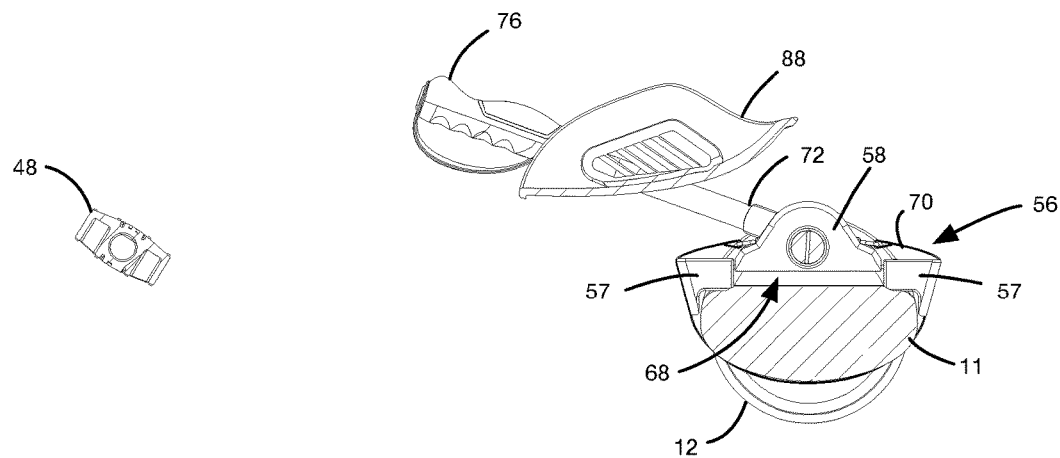
FIG. 4C is section view of the accessory and the self-balancing board of FIG. 4A along the line 4C-4C after biasing of the seat towards the self-balancing board.
Figure 4D:
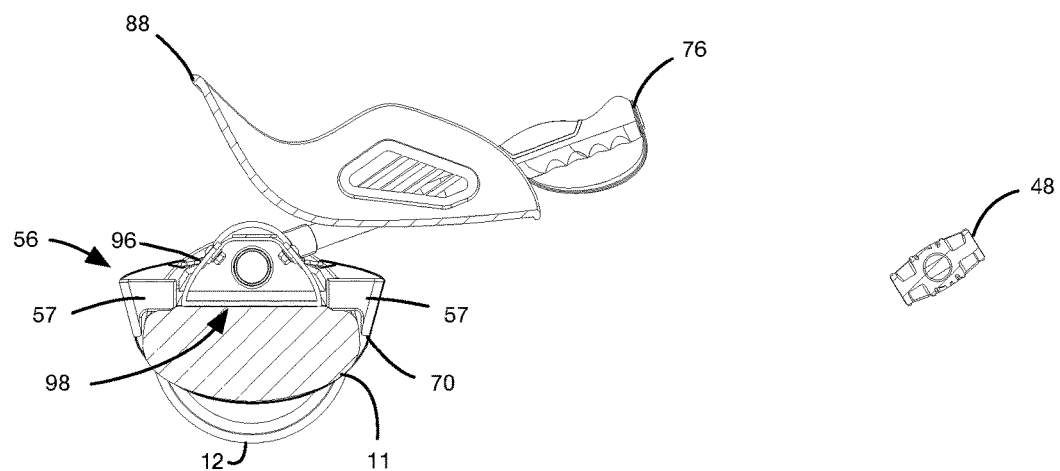
FIG. 4D is section view of the accessory and the self-balancing board of FIG. 4A along the line 4D-4D.
Figure 4E:
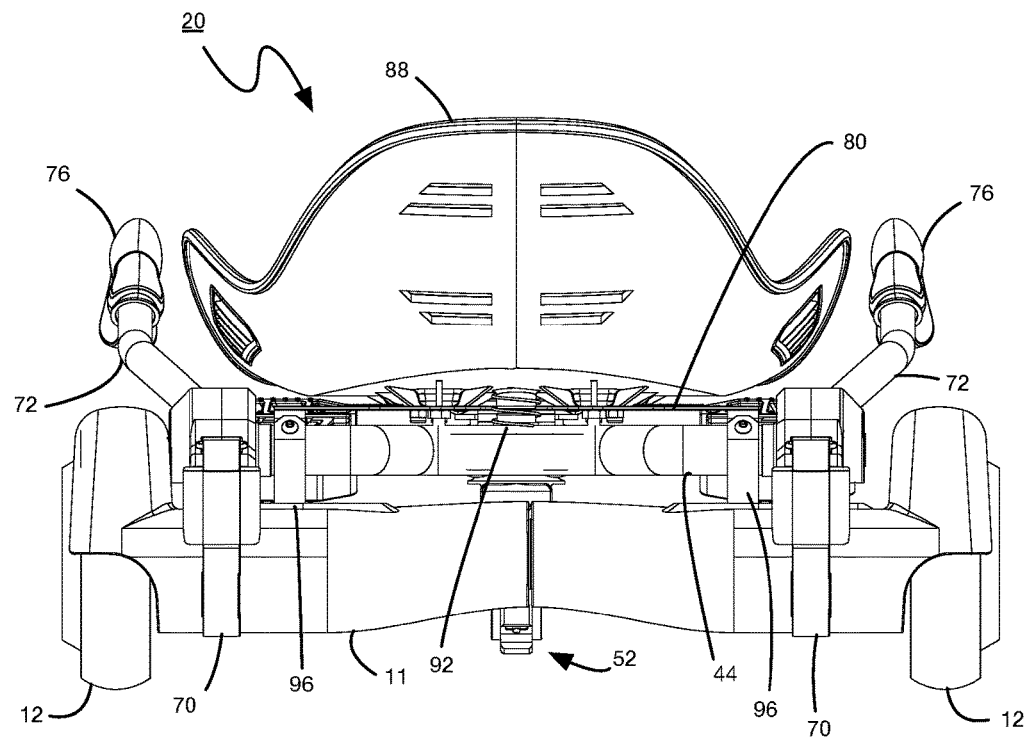
FIG. 4E is a rear view of the accessory of FIG. 2A secured to the self-balancing board of FIG. 1 after biasing of the seat towards the self-balancing board.
Figure 4F:
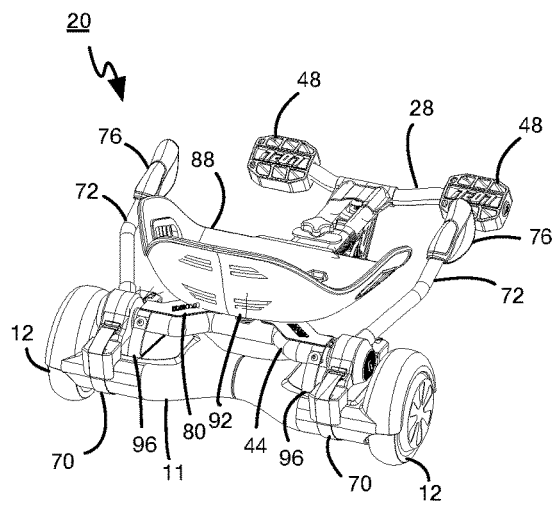
FIG. 4F is a rear perspective view of the accessory of FIG. 2A secured to the self-balancing board of FIG. 1 after biasing of the seat towards the self-balancing board.
Figure 4G:
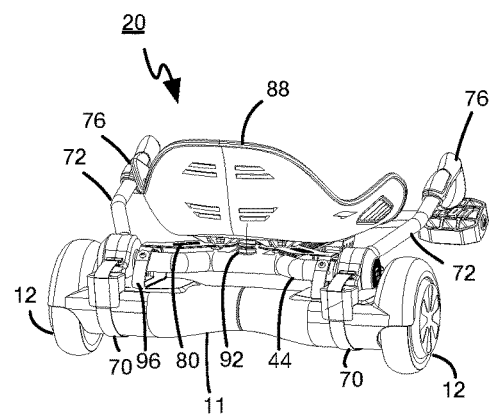
FIG. 4G is another rear perspective view of the accessory of FIG. 2A secured to the self-balancing board of FIG. 1 after biasing of the seat towards the self-balancing board.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Accessories for self-balancing boards are provided. The self-balancing boards have a foot-deck having two lateral foot-deck ends. Each lateral foot-deck end is coupled to a motor that drives a wheel in response to an orientation of the lateral foot-deck end relative to a horizontal plane. The foot-deck has at least one sensor that is triggered when a rider is in a riding position thereon. The accessory includes a chassis, at least one travel surface-contacting element coupled proximal to a first longitudinal end of the chassis to facilitate travel of the chassis over a travel surface, and a seat coupled to the chassis and configured to support a rider. An engagement structure releasably engages the self-balancing board and fails to trigger the at least one sensor. At least one sensor-triggering element is actuatable relative to the engagement structure between a first position, wherein the at least one sensor-triggering element fails to trigger the at least one sensor, and a second position, wherein the at least one sensor-triggering element triggers the at least one sensor. At least one control member coupled to and actuating at least one of the engagement structure and the at least one sensor-triggering element to control the orientation of the lateral foot-deck ends relative to a horizontal plane.

The design of the accessory enables it, while riderless, to be coupled to a self-balancing board with the at least one sensor-triggering element in the first position without triggering the sensor(s) of the foot-deck so that the self-balancing board can cut the power to the motors. Actuation of the at least one sensor-triggering element by a rider, either passively through their sitting in the seat of the accessory or actively such as via manual movement thereof, from the first position to the second position enables the self-balancing board to detect the presence of the rider via the sensor(s) and, as a result, power the motors to begin operation. Upon completing operation of the accessory and coupled self-balancing board, the rider can then either simply lift themselves from the accessory, such as by standing up, or return the at least one sensor-triggering element manually to the first position, depending on the particular design, to cause the self-balancing board to detect the absence of the rider and, thus, cut power to the motors.

A self-balancing board 10 is shown in FIG. 1. The self-balancing board 10 has a platform 11 that spans between two wheels 12. A foot-deck 13 of the platform 11 enables a rider to stand thereon. The foot-deck 13 is generally planar and may be textured and/or made from a material that provides traction between the foot of a rider and the platform 11. The foot-deck 13 has two lateral foot-deck ends 14 adjacent the wheels 12, a front foot-deck edge 15, and a rear foot-deck edge 16. The front foot-deck edge 15 and the rear foot-deck edge 16 represent the intersections between the front and back surfaces of the platform 11 and the foot-deck 13.

A motor proximal to each lateral foot-deck end 14 powers the wheel adjacent to it. Each motor is operated to rotate the adjacent wheel 12 based on the pitch of the lateral foot-deck end 14 relative to a horizontal plane when the self-balancing board is upright. The platform 11 may be, in some cases, split into two platform halves that can pivot relative to each other around an axis that is generally coaxial or at least generally parallel to the rotation axis of the wheels 12. In such cases, the orientation of the lateral foot-deck ends 14 can be determined via gyroscopes, accelerometers, or the like. In other cases, the platform 11 may be constructed to permit flexing of the platform 11, thereby enabling one lateral foot-deck end 14 to pivot somewhat independently of the other lateral foot-deck end 14 as a result of torsion forces on the platform. The pivoting between the lateral foot-deck ends 14 can be determined using a strain gauge or the like.

The foot-deck 13 has two pressure sensor regions 17 proximal to the lateral foot-deck ends 14 that detect pressure via pressure sensors located below the surface of the foot-deck 13, such as the weight of a rider. One or both of these pressure sensor regions 17 is triggered to power the motors to drive the wheels 12 of the self-balancing board 10 upon detecting a threshold pressure that it interprets to correspond to a rider standing atop of the foot-deck 13. Further, the self-balancing board 10 does not power off until the threshold pressure is no longer detected via the pressure sensors of the pressure sensor regions 17; that is, the pressure sensors are no longer triggered.

A wheel fender 18 around each wheel 12 inhibits rider contact with the wheels 12 while operating the self-balancing board 10.

If both lateral foot-deck ends 14 are similarly pitched in one direction while in operation, both adjacent motors will drive the self-balancing board in that direction at a similar speed, thus causing the self-balancing board to move in that direction. Alternatively, if both lateral foot-deck ends 14 are differently pitched in the same direction, the motors will drive the self-balancing board in that general direction, and the motor adjacent the more pitched lateral foot-deck end 14 will operate its associated wheel 12 more rapidly, causing the self-balancing board 10 to turn in that direction. If one lateral foot-deck end 14 is pitched in one direction and the other lateral foot-deck end 14 is similarly pitched in the opposite direction, the motors will rotate the wheels in opposite directions, causing the self-balancing board 10 to rotate at its location.

An accessory 20 for the self-balancing board 10 of FIG. 1 in accordance with an embodiment is shown in FIGS. 2A to 2G. The accessory 20 is intended to enhance both the safety and enjoyment of the self-balancing board by effectively converting a traditional self-balancing board into a powered kart that, when ridden, generally lowers the rider's center of gravity. The accessory 20 includes a chassis 24 that has a front cross-bar 28 at a front longitudinal end 30. Two parallel longitudinal extension tubes 32 extend backward from the front cross-bar 28 and are slidingly received within two parallel telescoping longitudinal tubes 36 and lockable at a number of positions via a locking knob 40. The two telescoping longitudinal tubes 36 are adjoined to a rear cross-bar 44 at a rear longitudinal end 46 of the chassis 24. The front cross-bar 28, the longitudinal extension tubes 32, the telescoping longitudinal tubes 36 and the rear cross-bar 44 can be made of any suitable material, such as aluminum or steel. The front cross-bar 28 is secured to the longitudinal extension tubes 32 via welding or another suitable approach. Similarly, the telescoping longitudinal tubes 36 are secured to the rear cross-bar 44 via welding or another suitable approach.

Two foot rests 48 are secured to opposite ends of the front cross-bar 28. The foot rests 48 provide a place to position one's feet so that the rider's feet do not drag on a travel surface, and can be fixed in orientation or made to swivel. The foot rests 48 can be used to carry the accessory 20 when it is not being ridden, either when the accessory 20 is secured to the self-balancing board 10 or detached from it. Further, the foot rests 48 can include heel rests in other embodiments to inhibit slippage of the rider's heels onto the travel surface. A front wheel assembly 52 is pivotally coupled to the front cross-bar 28 to enable the front wheel assembly 52 to swivel around a front wheel pivot axis FP that is generally vertically aligned when the accessory 20 is upright.

The accessory 20 has an engagement structure that can releasably engage the self-balancing board 10. In particular, the engagement structure includes a pair of foot-deck engagement elements 56, each of which is pivotally coupled to a lateral end of the rear cross-bar 44 so that the foot-deck engagement elements 56 pivot about a control pivot axis CP. The foot-deck engagement elements 56 include a pair of longitudinal end caps 57 that are spanned by a pivot bracket 58.

A pivot through-hole passes laterally through each of the pivot brackets 58 and receives a pivot bolt that extends from the lateral end of the rear cross-bar 44, enabling the pivot brackets 58 to pivot relative to the rear cross-bar 44.

Each longitudinal end cap 57 has an interface surface 60 that is constructed to interface with the foot-deck 13 proximal to one of the lateral foot-deck ends 14 adjacent the front foot-deck edge 15 and the rear foot-deck edge 16. The interface surfaces 60 are made of a resilient compressible material, such as rubber, to engage the foot-deck 13 of the self-balancing board 10 proximal to a lateral foot-deck end 14 thereof. A laterally extending lip 64 extends downwards from each longitudinal end cap 57 and spans the lateral width thereof. An interface gap 68 spans between the interface surfaces 60 of the longitudinal end caps 57 of each foot-deck engagement element 56. A cinch strap 70 is secured at each end to an upper surface of the foot-deck engagement element 56. The cinch strap 70 is made from a durable, flexible material such as hook-and-loop fabric or nylon, and can be let out, drawn in, and unsecured at or both ends from the foot-deck engagement element 56.

A control lever 72 extends from each pivot bracket 58 upwards and forwards. A hand grip 76 is provided at a distal end of each control lever 72.

A seat plate 80 is coupled to the chassis 24 via a hinge 84. The seat plate 80 is constructed from a rigid material, such as metal, that is secured to the hinge 84, such as by fasteners or welding. The hinge 84 is any suitable type of hinge, such as a piano hinge. The seat plate 80 pivots via the hinge 84 about an axis adjacent its fore. A seat 88 is fastened or otherwise secured to the seat plate 80 via any suitable means, such as fasteners and, in particular, nuts and bolts. The seat 88 is designed to comfortably hold a human rider in a seated position while they are operating the combined accessory 20 and self-balancing board 10. The seat 88 can be a basic molded seat made of plastic or the like, and can be provided with padding to make the rider's experience more enjoyable and to protect the rider from jarring while traveling over less smooth travel surfaces. The seat 88 may be mounted as low as possible to reduce the height of the center of gravity. This also brings the rider closer to the ground, reducing the chance of injury to the rider in the event of a fall.

A seat suspension structure in the form of a helical coil spring 92 suspends the seat plate 80 from pivoting towards the chassis 24 when the seat 88 is unoccupied by a rider. The helical coil spring 92 provides sufficient resistance to compression to maintain the seat plate 80 in an upwardly pivoted position, yet fully compresses when a rider sits in the seat 88. In other embodiments, the suspension structure can include two or more helical coil springs. The two or more helical coil springs can be laterally spaced to support the seat plate when pivoted down and reduce lateral tipping of the seat plate. Other types of suspension structures can be employed, such as compressible rubber elements, spring leaves, etc. Additionally, two or more spacer elements, such as threaded bolts, can project from the seat plate 80 or the chassis 24 to abut the other of the seat plate 80 and the chassis 24 when the seat plate 80 is pivoted downwards when a rider sits in the seat 88 and overcomes the resistance of the helical coil spring 92. The spacer elements can be adjustable to enable adjustment of the bottoming out position of the seat plate 80 over the chassis 24.

A sensor-triggering element in the form of a resilient, thick rubber strap 96 is secured at each end thereof to an underside of the seat plate 80 adjacent the interface gap 68, and forms a flexible arc of material that extends towards the chassis 24. The rubber strap 96 is compressible, but resistant to bending. Other suitable materials that are somewhat flexible can be employed in place of rubber.

A control member is provided for controlling the orientation of the lateral foot-deck ends 14. The control members are, in this embodiment, a control lever 72 that is coupled to each foot-deck engagement element 56 via its pivot bracket 58. The control lever 72 is typically constructed of steel or aluminum and welded or secured in some other manner to the pivot bracket 58. A control grip 76 mounted on the control lever 72 enables a rider to grip and manipulate the control lever 72.

FIGS. 3A to 3G show the accessory 20 engaging the self-balancing board 10. In order to have the accessory 20 engage the self-balancing board 10, each of the cinch straps 70 are unsecured at one end thereof. The interface surfaces 60 of the longitudinal end caps 57 are aligned with the lateral foot-deck ends 14 of the self-balancing board 10 and placed thereon. The accessory 20 is designed so that the engagement elements 56 are positioned proximal to the wheels 12 of the self-balancing board 10. The laterally extending lips 64 of the longitudinal end caps 57 engage a respective one of the front and back foot-deck edges 15, 16 of the platform 11 to inhibit movement of the engagement element 56 relative to the foot-deck 13. Once positioned on the self-balancing board 10, the loose end of each of the cinch straps 70 is pulled around the bottom of the platform 11, re-secured to the engagement element 56, and tightened to generally fix the accessory 20 to the self-balancing board 10.

The interface gaps 68 between the interface surfaces 60 of each of the engagement elements 56 span over at least the pressure sensor regions 17 of the self-balancing board 10. As a result, the engagement structure of the accessory 20 fails to trigger the pressure sensors when the accessory 20 engages the self-balancing board 10.

As no weight has been placed on the seat 88, the helical coil spring 92 suspends the seat board 80 in an elevated position, as shown. In this position, the rubber straps 96 secured to the seat board 80 are held in a first position, wherein they are elevated away from the foot-deck 13. As a result, the rubber straps 96 also fail to trigger the sensors of the foot-deck 13.

It may also be desirable to adjust various aspects of the accessory 20 for the rider. For example, the distance from the seat 88 to the foot rests 48 to accommodate for a rider's height or preference can be adjusted by loosening the locking knob 40, and either pulling the longitudinal extension tubes 32 further out of the telescoping longitudinal tubes 36, or by sliding the longitudinal extension tubes 32 further into the telescoping longitudinal tubes 36. Other aspects of the accessory can be made adjustable to accommodate riders of different sizes and/or having different preferences.

FIGS. 4A to 4G show the accessory 20 secured to the self-balancing board 10, wherein the weight of a rider sitting atop of the seat (not shown) overcomes the resistance provided by the helical coil spring 92, causing the seat board 80 to pivot downwards toward the chassis 24 and the foot-deck 13 of the self-balancing board 10. As a result, the rubber straps 96 secured to the seat board 80 are moved into a second position, wherein they are pushed into contact with the lateral foot-deck ends 14. As the rubber straps 96 contact and are urged against the foot-deck 13, they resist deformation by applying a force on the pressure sensor regions 17 of the foot-deck 13 with which they are aligned. The resistance of the rubber straps 96 is selected so that they apply a sufficient force to the pressure sensor regions 17, and thus the pressure sensors, so that the pressure detected by the pressure sensors surpasses the required threshold pressure, thereby triggering the pressure sensors. As a result, the self-balancing board 10 powers the motors.

In order to operate the combined accessory 20 and self-balancing board 10, the rider can manually pivot the control levers 72 and, thus, the engagement elements 56 to which they are fixedly coupled. Pivoting of the engagement elements 56 urges the corresponding lateral foot-deck ends 14 to pivot. As the orientation of each lateral foot-deck end 14 relative to horizontal is translated by the self-balancing board 10 to generate commands for the corresponding motor, the rider can thus control the rotation of each wheel 12, and thus the motion of the self-balancing board 10 and the engaged accessory 20.

The rubber straps 96 are held firmly in contact with the pressure sensor regions 17 of the foot-deck 13 by the weight of the rider atop of the seat 88.

The rider can cause either wheel 12 of the self-balancing board 10 to which the accessory 20 is secured to accelerate in either a forward or backward direction. This is achieved by using the corresponding control lever 72 to pivot the lateral foot-deck end 14. The control levers 72 freely pivot relative to the chassis 24. Pivoting the control lever 72 in a direction applies a torqueing force to the corresponding lateral foot-deck end 14 by the force of the longitudinal end of the control foot 108 corresponding to the direction in which the control lever 72 is being pivoted on the lateral foot-deck end 14, and by the tension of the cinch strap 70.

The control levers 72 can be pivoted in either a forward or backward direction. Pivoting both control levers 72 by the same degree and in the same direction causes the wheels 12 to accelerate or decelerate in the direction to which the control levers 72 are being pivoted. Thus, a rider can elect to accelerate or decelerate in a forward direction or a backward direction, or stop.

Additionally, a rider can elect to pivot each control lever 72 to differing angles to cause a difference in the speed of the wheels 12, thereby causing the combined self-balancing board 10 and the accessory 20 secured thereto to turn as it travels. The rider can even rotate the self-balancing board 10 and the accessory 20 secured thereto in a single location if one control lever 72 is pivoted to pivot the corresponding lateral foot-deck end 14 by an angular disposition in one direction, and if the other control lever 72 is pivoted to pivot the other lateral foot-deck end 14 by the same angular disposition in the opposite direction.

The accessory 20 can be removed from the self-balancing board 10 by releasing at least one end of each cinch strap 70.

As will be appreciated, the seat can be suspended via other suitable configurations, such as a linear suspension.

Figure 5A:
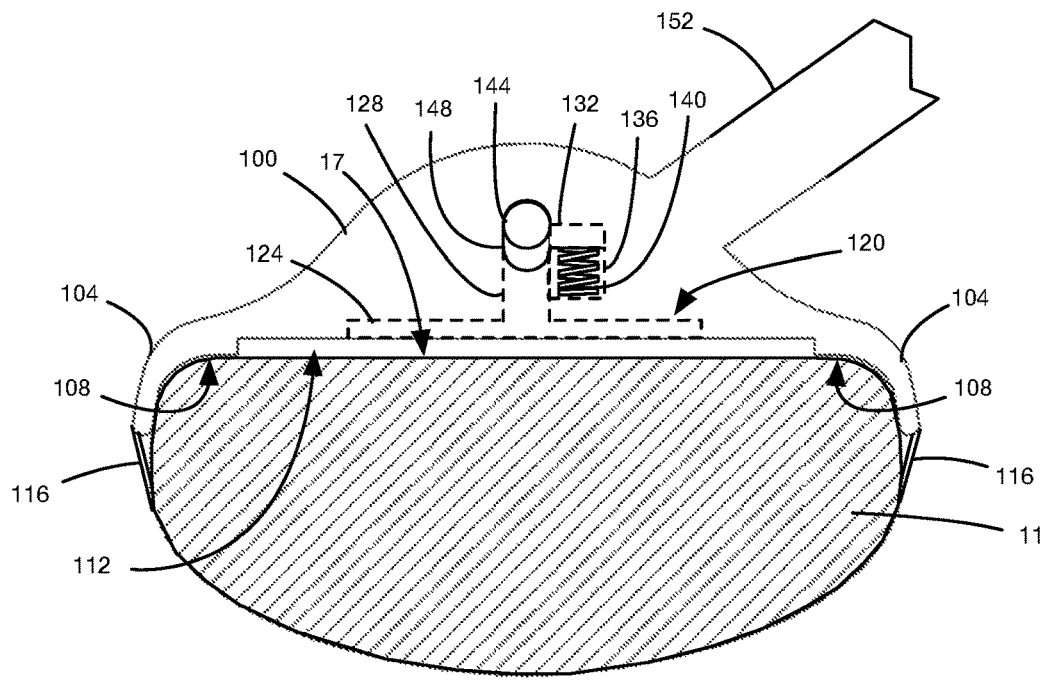
FIG. 5A is a partial sectional view of a portion of an accessory in accordance with another embodiment positioned atop of the self-balancing board of FIG. 1, wherein a sensor-engaging pad is suspended above a sensor of the self-balancing board.

FIG. 5A shows a sectional view of an engagement structure of an accessory in accordance with another embodiment engaging the self-balancing board 10. The engagement structure includes, in this case, a pair of foot-deck engagement elements 100, each of which is pivotally coupled to a chassis of an accessory so that the foot-deck engagement elements 100 pivot about a control pivot axis that is generally parallel to a rotation axis of the wheels 12 of the self-balancing board 10. Each longitudinal end cap 57 has two laterally extending lips 104 that extend downwards from each longitudinal end thereof. Two interface surfaces 108 are located on an underside of the engagement element adjacent the laterally extending lips 104. The interface surfaces 108 are made of a resilient compressible material, such as rubber, to engage the foot-deck 13 of the self-balancing board 10 proximal to a lateral foot-deck end 14 thereof.

An interface gap 112 spans between the interface surfaces 108 of each foot-deck engagement element 100, and generally spans at least over the pressure sensor region 17 of the corresponding lateral foot-deck end 14 when the foot-deck engagement element 100 releasably engages the self-balancing board 10. A cinch strap 116 is secured at each end to an upper surface of the foot-deck engagement element 100. The cinch strap 116 is made from a durable, flexible material such as hook-and-loop fabric or nylon, and can be let out, drawn in, and unsecured at or both ends from the foot-deck engagement element 100. In order to secure the accessory to the self-balancing board 10, the cinch straps 116 are unsecured from the main body of the foot-deck engagement element 100 at one end, looped under the platform 11 of the self-balancing board 10, re-secured to the main body of the foot-deck engagement element 100, and tightened.

The foot-deck engagement element 100 has a recess therein in which is located a sensor triggering element in the form of a plunger 120. The plunger 120 has a plate portion 124 that extends generally horizontally when the accessory engages an unpowered self-balancing board 10, a shaft portion 128 that extends vertically therefrom, and a tab 132 extending longitudinally from the upper end of the shaft portion 128. The tab 132 is located within a suspension recess 136. A suspension member 140 in the form of a helical coil spring is positioned between the tab 132 and the bottom of the suspension recess 136 to suspend the plunger 120. A post 144 extends laterally from the chassis of the accessory, pivotally through an upper end of the shaft portion 148, and through a vertically elongated slot 136 in the main housing of the foot-deck engagement element 100 on either side of the foot-deck engagement portion 100. Thus, the weight of the rear portion of the chassis, seat, etc. of the accessory rests on the post 144. The suspension member 140 resists compression sufficiently such that the downward force of the post 144 when the seat of the accessory is empty is insufficient to compress the suspension member 140 beyond the state shown in FIG. 5A. In this state, the plunger 120 is in a first position fails to trigger the at least one sensor in the foot-deck 13 of the self-balancing board 10 by exceeding the threshold pressure.

A control lever 152 is fixed to the foot-deck engagement element 100 to pivot the foot-deck engagement element 100 about the post 144 extending from the chassis of the accessory.

Figure 5B:
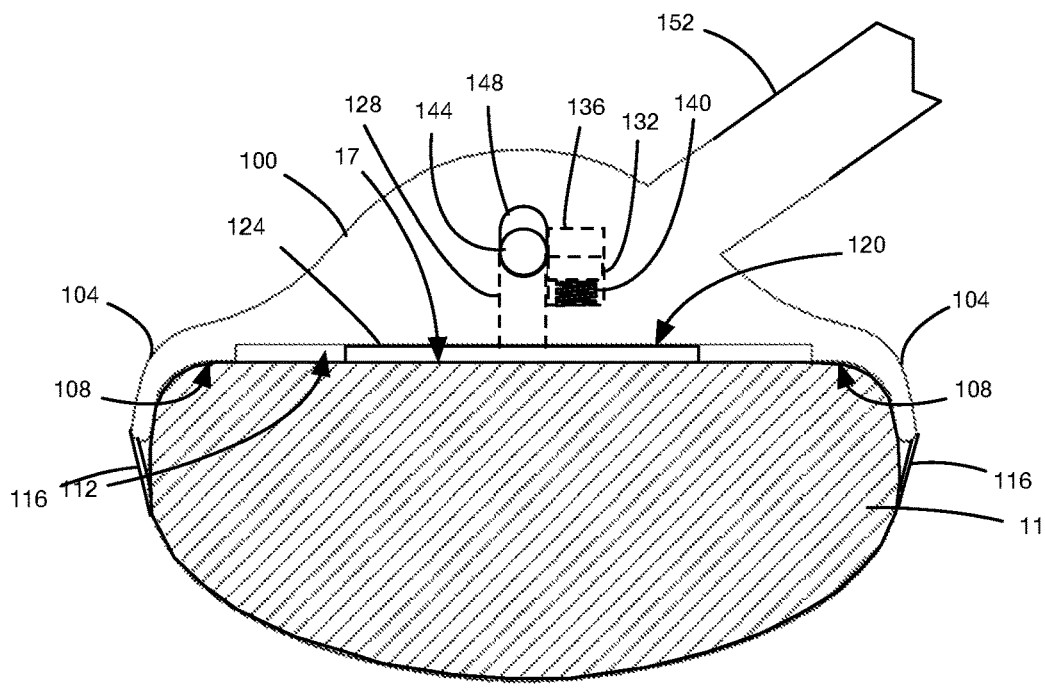
FIG. 5B is a partial sectional view of the portion of the accessory of FIG. 5A positioned atop of the self-balancing board of FIG. 1, wherein the sensor-engaging pad is pushed into contact with the sensor of the self-balancing board.

FIG. 5B illustrates the position of the plunger 120 when a rider is seated in the seat of the accessory. The rider's weight is borne by the post 144 which now bears down on the plunger 120 with sufficient force to cause the tab 132 to compress the suspension member 140. As a result, the plate portion 124 is moved to the shown second position, in which the plunger 120 triggers the pressure sensors in the foot-deck 13 of the self-balancing board 10.

Figure 6A:
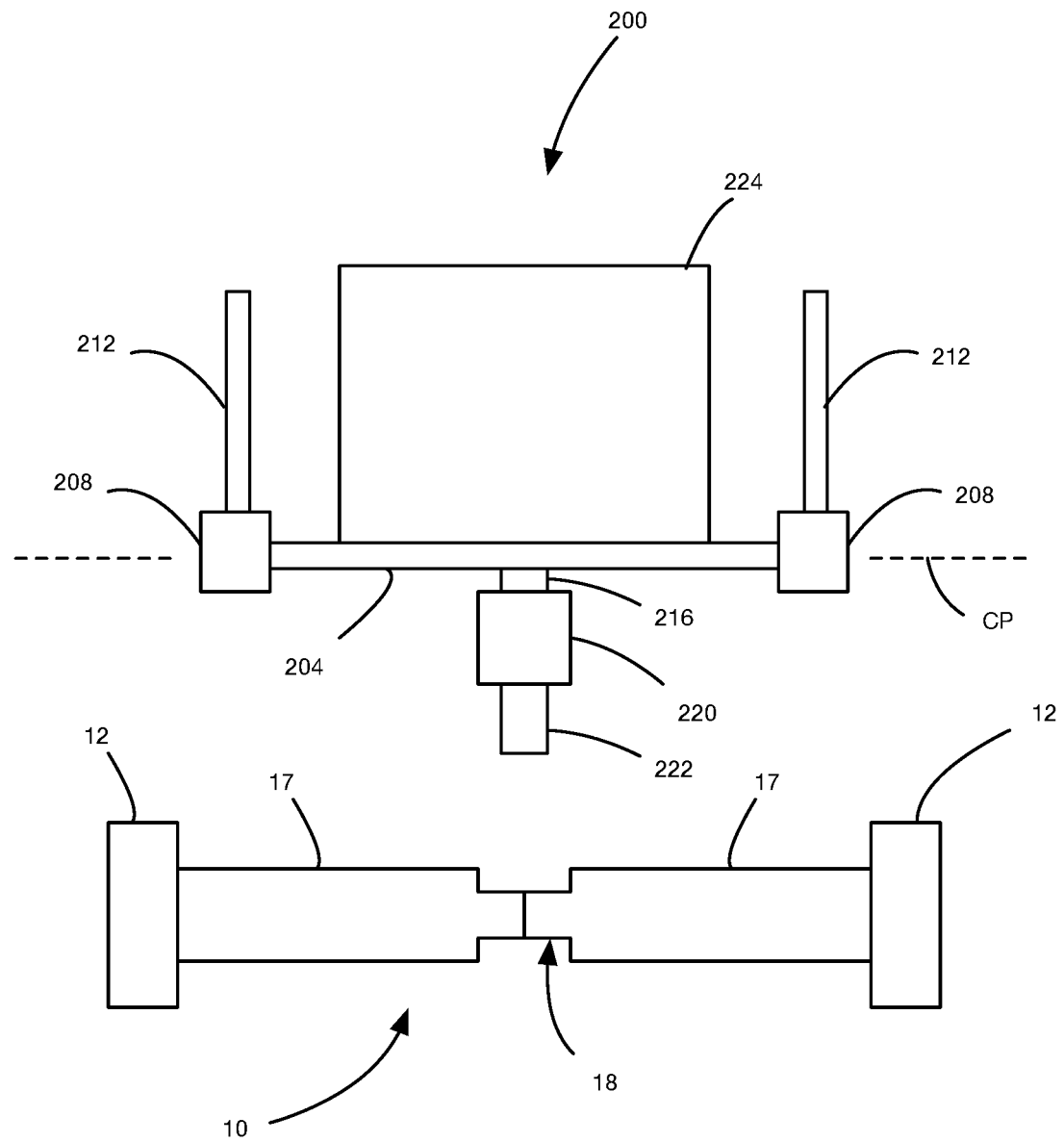
FIG. 6A is a rear view of an accessory in accordance with a further embodiment aligned for engaging the self-balancing board of FIG. 1.

FIG. 6A shows an accessory 200 in accordance with a further embodiment for use with the self-balancing board 10. The accessory includes a chassis that has a rear cross-bar 204. A pair of sensor triggering elements in the form of control shoes 208 are coupled to the rear cross-member 204 so that they pivot about an axis CP that is generally parallel to the rotation axis of the wheels 12 of the self-balancing board 10. Control levers 212 extend upwardly and forwardly from the control shoes 208.

A suspension post 216 extending generally vertically from the underside of the chassis of the accessory 200 is received within an aperture (not shown) in the top of an engagement structure in the form of a central board rest 220. A rubber or other suitable interface surface is provided along the underside of the central board rest 220. A helical coil spring (not shown) suspends the chassis relative to the central board rest 220. The central board rest 220 is configured to fit over and rest on a central narrow portion 18 of the self-balancing board 10. A wheel assembly 222 is secured to the front end of the chassis of the accessory 200. A seat 224 is secured atop of the chassis.

Figure 6B:
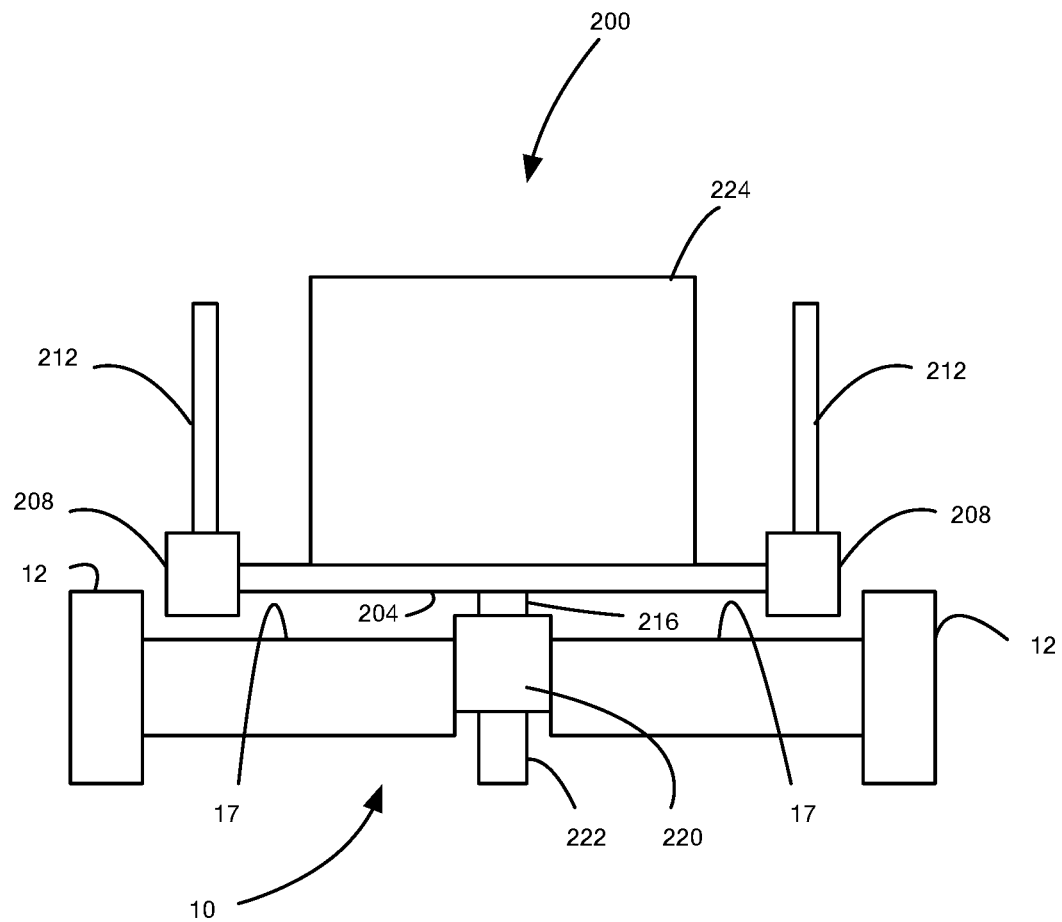
FIG. 6B is a rear view of the accessory of FIG. 6A after engaging the self-balancing board of FIG. 1.

FIG. 6B shows the accessory 200 engaging the self-balancing board 10. The central board rest 220 is located atop of the central narrow portion 18 of the self-balancing board 10. The helical coil spring between the suspension post 216 and the central board rest 220 is sufficiently resistant to compression such that the chassis and the control shoes 208 are maintained suspended in a first position above the foot-deck 13 in which the control shoes do not trigger the pressure sensors of the pressure sensor regions 17 of the self-balancing board 10.

Figure 6C:
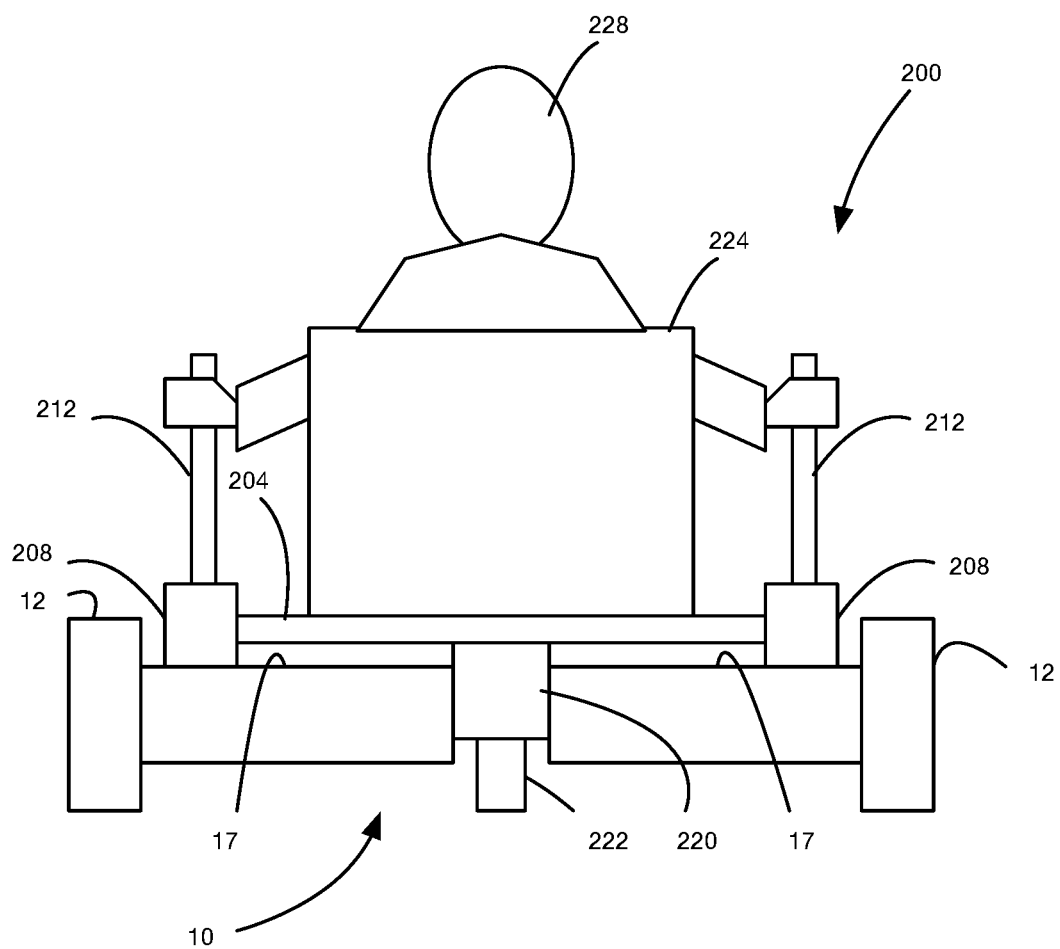
FIG. 6C is a rear view of the accessory of FIG. 6A secured to the self-balancing board of FIG. 1 when a rider is positioned in the seat of the accessory.
Figure 7A:
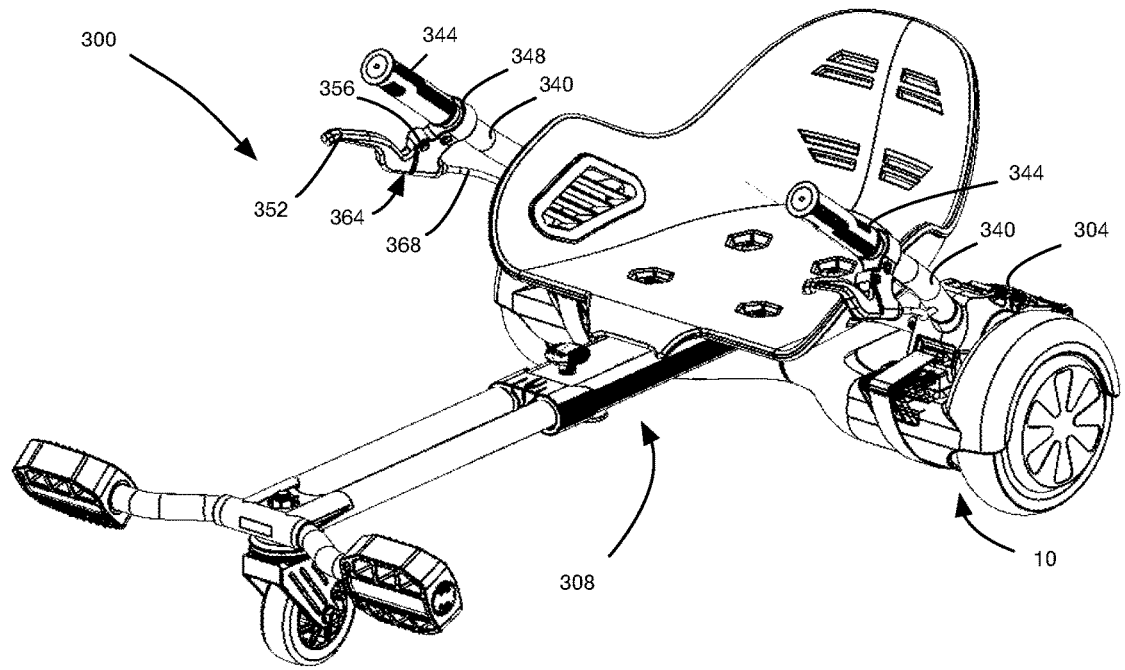
FIG. 7A is a top, front, right side perspective view of an actuated accessory in accordance with another embodiment positioned atop of the self-balancing board of FIG. 1, wherein the actuated accessory has a manually actuated sensor-triggering plate for engaging a sensor of the self-balancing board.
Figure 7B:
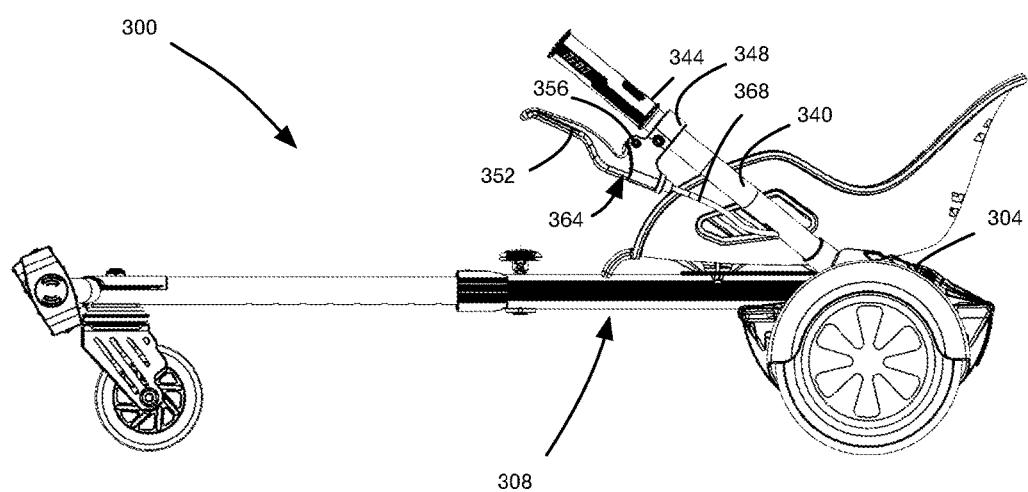
FIG. 7B is a right side elevation view of the actuated accessory and self-balancing board of FIG. 7A.
Figure 7C:
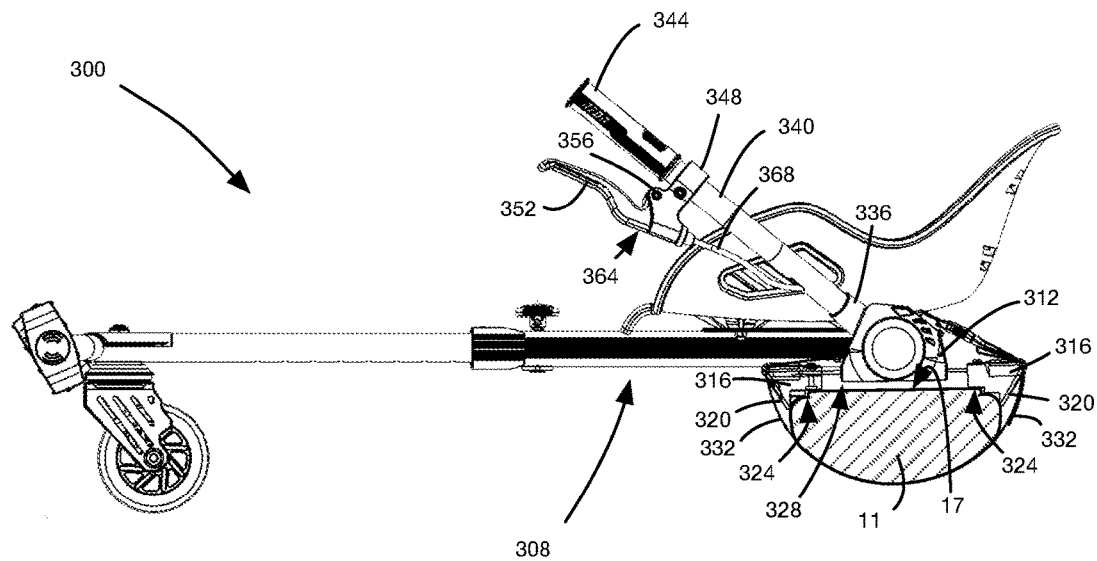
FIG. 7C is a right side section view of the actuated accessory and self-balancing board of FIG. 7A.
Figure 7D:
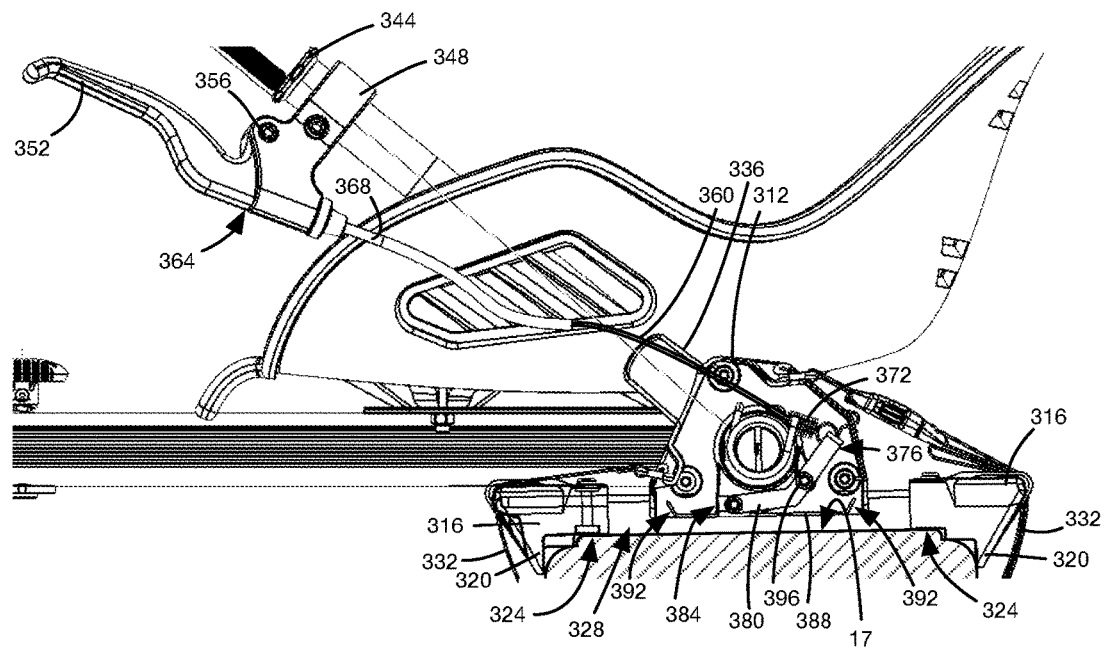
FIG. 7D is a partial right side section view of the actuated accessory and self-balancing board of FIG. 7A.

FIG. 6C shows the accessory 200 engaging the self-balancing board 10 when a rider 228 is sitting in the seat 224. The additional weight of the rider 228 is sufficient to overcome the resistance of the helical coil spring to compress it, thereby moving the control shoes 208 to engage the pressure sensor regions 17 of the self-balancing board 10 in a second position. A portion of the weight of the accessory 200 and the rider 228 is transferred by the control feet 208 to the pressure sensor regions 17 of the self-balancing board 10. This portion is controlled at least in part by the resistance of the helical coil spring that suspends the chassis atop of the central board rest 220. The resistance of the helical coil spring is selected such that sufficient weight is transferred to the pressure sensor regions 17 to surpass the threshold pressure, thereby triggering the sensors. As a result, the motors are powered, thereby enabling the rider to operate the self-balancing vehicle 10 via the accessory 200.

When the rider rises out of the seat 224, the resistance of the helical coil spring is sufficient to urge the chassis and coupled control feet 208 upwards so that the control feet 208 no longer trigger the pressure sensors in the pressure sensor regions 17, thereby allowing it to be powered off.

An actuated accessory 300 for the self-balancing board 10 of FIG. 1 in accordance with another embodiment is shown in FIGS. 7A to 7D. The accessory 300 is similar in general design to the accessory 20 of FIGS. 2A to 4G. Accordingly, like components will be numbered similarly and will not be described.

The actuated accessory 300 has a pair of foot-deck engagement elements 304, each of which is pivotally coupled to a chassis 308 of the actuated accessory 300 so that the foot-deck engagement elements 304 pivot about a control pivot axis that is generally parallel to a rotation axis of the wheels 12 of the self-balancing board 10.

Each foot-deck engagement element 304 has a pivot bracket 312 coupled to two longitudinal end caps 316. Each longitudinal end cap 316 has two laterally extending lips 320 that extend downwards from each longitudinal end thereof. Two interface surfaces 324 are located on an underside of the engagement elements 304 adjacent the laterally extending lips 320. The interface surfaces 324 are made of a resilient compressible material, such as rubber, to engage the foot-deck 13 of the self-balancing board 10 proximal to a lateral foot-deck end 14 thereof.

An interface gap 328 spans between the interface surfaces 324 of each foot-deck engagement element 304, and generally spans at least over the pressure sensor region 17 of the corresponding lateral foot-deck end 14 when the foot-deck engagement element 304 releasably engages the self-balancing board 10. A cinch strap 332 is secured at each end to an upper surface of the foot-deck engagement element 304. The cinch strap 332 is made from a durable, flexible material such as hook-and-loop fabric or nylon, and can be let out, drawn in, and unsecured at or both ends from the foot-deck engagement element 304. In order to secure the actuatable accessory 300 to the self-balancing board 10, the cinch straps 332 are unsecured from the main body of the foot-deck engagement element 304 at one end, looped under the platform 11 of the self-balancing board 10, re-secured to the main body of the foot-deck engagement element 304, and tightened.

A control lever sleeve 336 extends from the pivot bracket 312. A control lever 340 is secured in the control lever sleeve 336 and extends forward from the pivot bracket 312. A hand grip 344 is provided at a distal end of the control lever 340. The hand grip 344 is made of a soft resilient material, such as rubber, and enables a rider to comfortably grip and shift the control lever 340 to pivot the foot-deck engagement element 304.

A trigger lever mount 348 is secured to the control lever 340 adjacent the hand grip 344. An actuator in the form of a trigger lever 352 is pivotally coupled to the trigger lever mount 348 via a pivot bolt 356. The trigger lever 352 pivots about an actuator pivot axis that is coaxial with the pivot bolt 356. The trigger lever 352 is spring biased towards a rest position shown in FIGS. 7A to 7D, and can be pivoted towards a squeezed position towards the hand grip 344. A cable 360 is secured at a first end adjacent a cable attachment end 364 that is distal from the pivot bolt 356, passes through the trigger lever mount 348, through a cable housing 368, through the control lever 340, and into the pivot bracket 312. The cable housing 348 shields the cable 360 between the trigger lever bracket 348 and the control lever 340. A second end of the cable 360 is secured to a first end of a resiliently deformable member in the form of a deformable coil spring 372. A second end of the deformable coil spring 372 is secured to a first end 376 of a positioning member in the form of a pivoting lever arm 380. A second end 384 of the pivoting lever arm 380 is pivotally coupled to a sensor-triggering element in the form of a sensor-triggering plate 388. The sensor-triggering plate 388 has a central planar portion 390 with two shoulders 392 at its longitudinal ends. The pivoting lever arm 380 pivots about a pivot bolt 396, and is biased towards an idle position as shown in FIG. 8A via a biasing spring 400.

The sensor-triggering plate 388 is actuatable between an idle position, wherein the at least one sensor-triggering element fails to trigger the at least one sensor, and a triggering position, wherein the at least one sensor-triggering element triggers the at least one sensor.

Figure 8A:
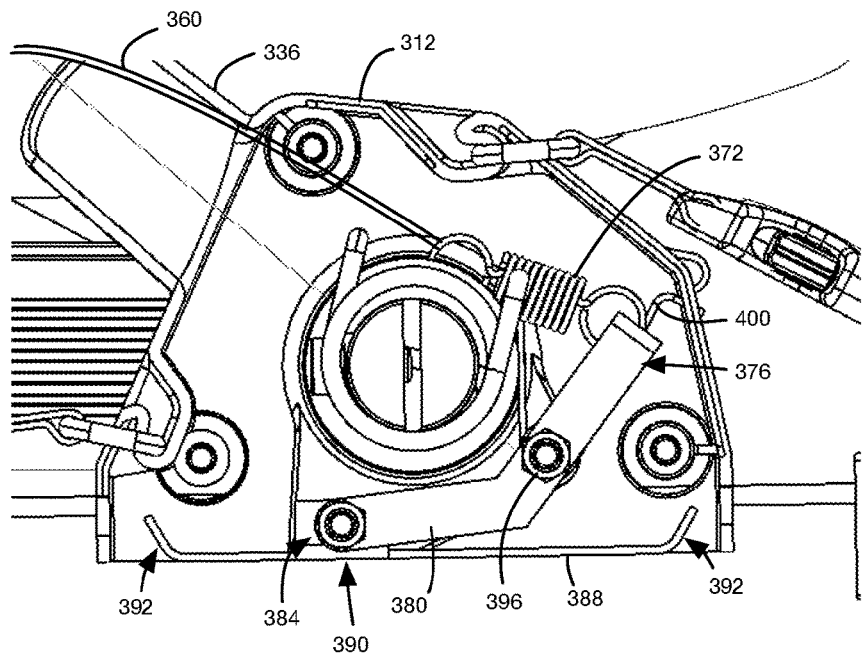
FIG. 8A is a partial right side view of the actuated accessory of FIG. 7A.

FIG. 8A shows the orientation of the pivoting lever arm 380 and sensor-triggering plate 388 when the trigger lever 352 is not gripped by a hand of a rider and is biased towards the rest position. When the trigger lever 352 is in the rest position, the tension on the cable 360 is insufficiently low to overcome the force of the biasing spring 400 to pivot the pivoting lever arm 380 from the idle position. In the idle position, the sensor-triggering plate 388 is withdrawn from the pressure sensor region 17 of the self-balancing board 10.

Figure 8B:
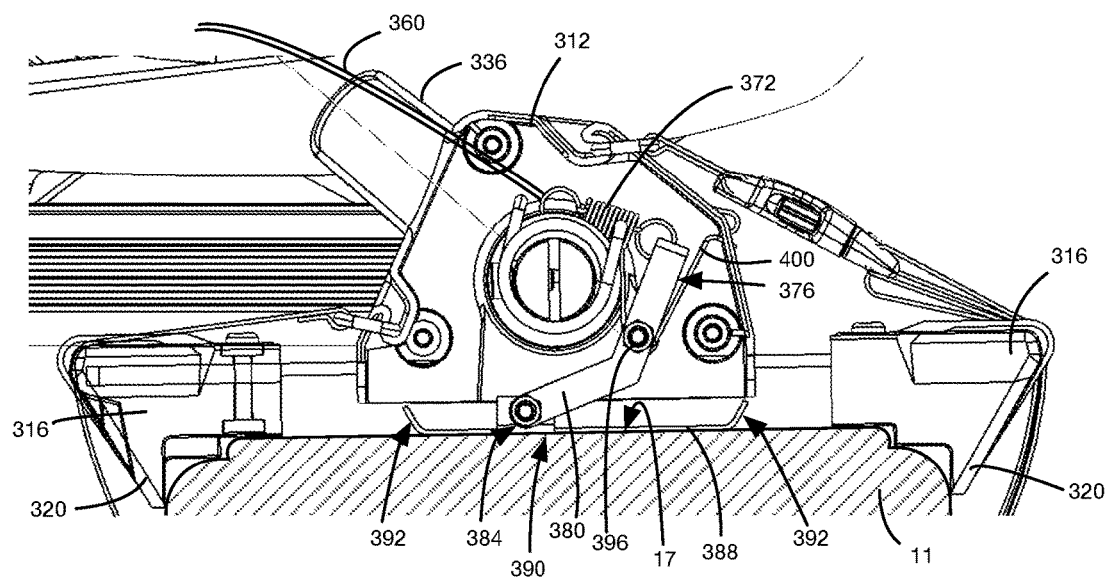
FIG. 8B is a partial right side section view of the actuated accessory and self-balancing board of FIG. 7A after engagement of the sensor by the sensor-engaging plate.

As the trigger lever 352 is pivoted about the actuator pivot axis towards the control member 340, such as by a rider grasping the hand grip 344 and the trigger lever 352 with a hand and squeezing, the cable 360 is tensioned as the distance between the cable attachment end 364 and the deformable coil spring 372 is lengthened. As the cable 360 is tensioned, the deformable coil spring 372 and the first end 376 of the pivoting lever arm 380 are pulled towards the distal end of the control member 340. The tension force applied by the trigger lever 352 is sufficient to overcome the biasing force applied by the biasing spring on the pivoting lever arm 380 towards the idle position. The first end 376 is pivoted about the pivot bolt 396 towards the distal end of the control member 340, causing the second end 384 of the pivoting lever arm 380 to pivot towards the pressure sensor region 17. As the second end 384 pivots towards the pressure sensor region 17, the sensor-triggering plate 388 is pushed into contact with the pressure sensor region 17. The sensor-triggering plate 388 freely pivots relative to the pivoting lever arm 380 and can contact the pressure sensor region 17 so that one of the shoulders 392 contacts the pressure sensor region 17 before the other shoulder 392 does. Continued pivoting of the pivoting lever arm 380 causes the planar portion 390 of the sensor-triggering plate 388 to pivot into contact with the pressure sensor region 17 until the pivoting lever arm 380 is pivoted towards a triggering position and the sensor-triggering plate 388 is flatly in contact with the pressure sensor region 17, as shown in FIG. 8B.

As further pivoting of the pivoting lever arm 380 is limited by contact of the sensor-triggering plate 388 with the pressure sensor region 17, further tension applied by the trigger lever 352 expands the deformable coil spring 372 so that the cable 360 is not significantly stretched. Thus, the deformable coil spring 372 absorbs the further tensioning of the cable 360.

Contact of the sensor-triggering plate 388 triggers the pressure sensor region 17 of the self-balancing board 10, thus conditioning the self-balancing board 10 to an "on" state. As long as the rider continues to squeeze the trigger lever 352 on each control member 340, the self-balancing board 10 will be thus powered. When the rider determines that they would like to turn off the self-balancing board 10 so that the rider can dismount from the actuated accessory 300, the rider can release the trigger levers 352 on each control member 340. Upon release of the trigger levers 352, the tension on the cable 360 is released, thus enabling the biasing spring 400 to pivot the pivoting lever arm 380 from the triggering position to the idle position. As the pivoting lever arm 380 pivots towards the idle position, the sensor-triggering plate 388 is withdrawn from contact with the pressure sensor region 17. The withdraw of the pressure of the sensor-triggering plate 388 on the pressure sensor region 17 causes the self-balancing board 10 to assume an "off" state.

Using the structure described above, a rider may fasten the actuated accessory 300 to the self-balancing board 10 and sit in the seat 88 without the concern that the motors of the self-balancing board 10 will commence operation to move the self-balancing board 10 and the actuated accessory 300 secured thereto. The rider may then subsequently manually actuate the at least one sensor-triggering plate 388 between the idle position and the triggering position via movement of the trigger levers 352 relative to the hand grips 344 of the control members 340.

Modifications to the above-described structures and new structures for actuating the sensor-triggering element via hand-operated actuators will occur to those skilled in the art.

Figure 9A:
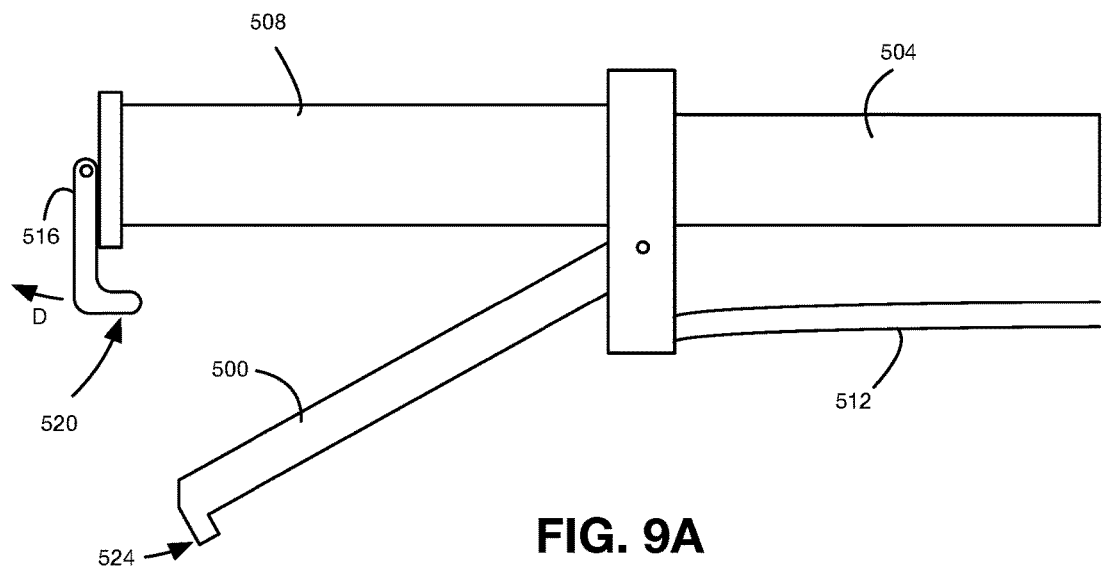
FIG. 9A is a schematic diagram of a trigger lever for actuating a sensor-triggering element in accordance with another embodiment.

FIG. 9A shows a trigger lever 500 pivotally coupled to a control member 504 for actuating a sensor-engaging element in accordance with another embodiment. A hand grip 508 is positioned at a distal end of the control member 504. The trigger lever 500 is coupled to a cable 512 that actuates a sensor-triggering element (not shown) in a similar manner as in the actuated accessory shown in FIGS. 7A to 8B. The trigger lever 500 is spring biased to a rest position shown in FIG. 9A, in which tension along the cable 512 is reduced.

A locking member 516 is pivotally coupled to the control member 504 and is spring biased to a locking position shown in FIG. 9A, but can be pivoted in a direction D. The locking member 516 has a locking lip 520.

Figure 9B:
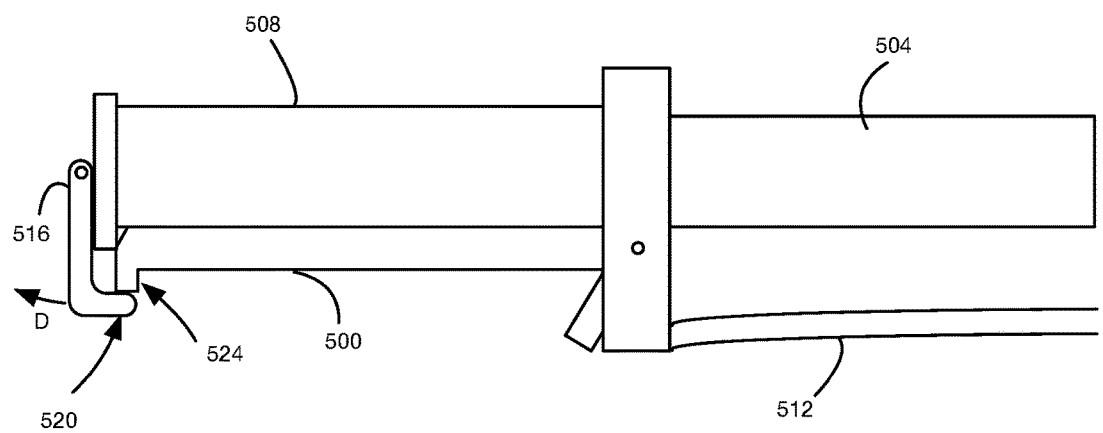
FIG. 9B shows the trigger lever after being releasably secured in an actuating position via a locking member.

When the trigger lever 500 and the hand grip 508 are squeezed with a hand to bring the trigger lever 500 towards the hand grip 508 and control member 504, the locking member 516 can pivot out of the way to enable the trigger lever 500 to be brought close to the hand grip 508. Upon pivoting of a distal end of the trigger lever 500 past the locking lip 520 of the locking member 516, the locking member 516 pivots back into place via the biasing force applied by a biasing spring, thus fitting over the distal end 524 of the trigger lever 500, as is shown in FIG. 9B. The biasing force biasing the trigger lever 500 to the rest position shown in FIG. 9A is unable to overcome the locking lip 520 and thus the trigger lever 500 is locked against the hand grip 508. The locking member 516 can be manually pivoted in direction D to enable the trigger lever 500 to pivot back to the rest position shown in FIG. 9A.

While, in the above-described embodiments, the accessories are described in use with the self-balancing board 10, in other embodiments, the sensor-triggering elements and structures described herein can be employed with other self-balancing boards.

While control levers are employed in the above described embodiments to control the orientation of the lateral foot-deck ends of the self-balancing board, other control members can be employed for this purpose.

While the engagement structure enables the accessory to be secured to the self-balancing board in the above-described embodiments, in other embodiments, it can interface with the self-balancing board without being secured to it, relying at least partially on the weight of the accessory and additionally the passenger to maintain the accessory in engagement with the self-balancing board.

Other types of travel surface-contacting elements to facilitate travel of the chassis over a travel surface other than wheels can be employed for the accessory. For example, the accessory can be fitted with a ski runner that could be used over indoor flooring, grass, snow, etc. In another embodiment, a tank track could be deployed on the accessory.

The length and orientation of the control lever(s) may be made to be adjustable in a variety of manners, such as the angle that they extend from the pivot brackets (the angular position), the angle at which they extend laterally away from a vertical axis, etc.

The accessories can be made to accommodate self-balancing boards of various shapes and sizes.

More sophisticated pedal or foot straps can be employed to further secure the rider.

The pressure sensor region or regions of a self-balancing board can be of any size and shape. The interface surface(s) of the engagement structures can be accordingly designed to engage regions of the self-balancing board other than the sensor region(s).

In other embodiments, the self-balancing board can have other types of sensors, such as optical (e.g. photovoltaic) sensors, infrared proximity sensors, or ultrasonic sensors, to detect the presence of a rider atop of the foot-deck. For example, a first set of light sensors can be positioned on the foot-deck and a second set of light sensors can be positioned at another location on the self-balancing board that is expected to be free of obstruction during use, such as atop of the wheel fenders. Upon detecting a threshold difference in the light received via the first set of sensors in comparison to that received via the second set of sensors, the self-balancing board can deem that a rider is positioned on the foot-deck and covering the first set of light sensors while the second set of light sensors are uncovered.

In another example, an infrared proximity sensor on the foot deck could be used. The infrared proximity sensor would normally be triggered when a user places their foot on the foot deck, acting to reflect the infrared beam emitted by the sensor. When used in conjunction with the accessory described herein, such a sensor would be triggered by the strap 96 when the rider sits in the seat and the strap engages the foot deck and obstructs the sensor. Alternatively, a bar or plate could be provided in place of the strap and would be brought down close to the foot deck without contacting it, in sufficient proximity to the sensor to trigger the sensor.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. An actuated accessory for a self-balancing board, the self-balancing board comprising a foot-deck having two lateral foot-deck ends, each lateral foot-deck end being coupled to a motor that drives a wheel in response to an orientation of the lateral foot-deck end relative to a horizontal plane, the foot-deck having at least one sensor that is triggered when a rider is in a riding position thereon, the accessory comprising:
    a chassis;
    at least one travel surface-contacting element coupled proximal to a first longitudinal end of the chassis to facilitate travel of the chassis over a travel surface;
    a seat coupled to the chassis and configured to support a rider;
    an engagement structure that releasably engages the self-balancing board and fails to trigger the at least one sensor;
    at least one sensor-triggering element that is actuatable relative to the engagement structure between an idle position, wherein the at least one sensor-triggering element fails to trigger the at least one sensor, and a triggering position, wherein the at least one sensor-triggering element triggers the at least one sensor;
    at least one control member coupled to and actuating at least one of the engagement structure and the at least one sensor-triggering element to control the orientation of the lateral foot-deck ends relative to a horizontal plane; and
    at least one actuator coupled to the at least one sensor-triggering element, the at least one actuator being manually actuatable by the rider when the rider is in the seat to actuate the at least one sensor-triggering element between the idle position and the triggering position.

2. The actuated accessory as claimed in claim 1, wherein each of at least one actuator is positioned towards a distal end of a corresponding one of the at least one control member.

3. The actuated accessory as claimed in claim 2, wherein the at least one actuator actuates a corresponding one of the at least one sensor-triggering element when the actuator is moved towards the corresponding one of the at least one control member.

4. The actuated accessory as claimed in claim 3, wherein the at least one actuator is coupled to a cable that actuates the corresponding one of the at least one sensor-triggering element.

5. The actuated accessory as claimed in claim 4, wherein the cable is coupled to a positioning member to which the corresponding one of the at least one sensor-triggering element is coupled, wherein tensioning of the cable by the actuator causes the positioning member to pivot to move the corresponding one of the at least one sensor-triggering element from the idle position towards the triggering position.

6. The actuated accessory as claimed in claim 5, wherein the positioning member is biased to pivot to move the corresponding one of the at least one sensor-triggering element towards the idle position.

7. The actuated accessory as claimed in claim 6, wherein the at least one actuator pivots about an actuator pivot axis towards the corresponding one of the at least one control member to tension the cable.

8. The actuated accessory as claimed in claim 7, wherein the cable is coupled to the positioning member via a resiliently deformable member that deforms when the corresponding one of the at least one sensor-triggering element abuts a corresponding one of the at least one sensor and tension is applied to the cable by the actuator.

9. The actuated accessory as claimed in claim 8, wherein the resiliently deformable member comprises a coil spring.

10. The actuated accessory as claimed in claim 1, wherein each of the at least one actuator is lockable so that a corresponding one of the at least one sensor-triggering element is fixed in the triggering position.

11. An actuated accessory for a self-balancing board, the self-balancing board comprising a foot-deck having two lateral foot-deck ends, each lateral foot-deck end being coupled to a motor that drives a wheel in response to an orientation of the lateral foot-deck end relative to a horizontal plane, the foot-deck having at least one sensor that is triggered when a rider is in a riding position thereon, the accessory comprising:
    a chassis;
    an engagement structure that releasably engages the self-balancing board and fails to trigger the at least one sensor;
    at least one sensor-triggering element that is actuatable relative to the engagement structure between an idle position, wherein the at least one sensor-triggering element fails to trigger the at least one sensor, and a triggering position, wherein the at least one sensor-triggering element triggers the at least one sensor;

at least one control member coupled to and actuating at least one of the engagement structure and the at least one sensor-triggering element to control the orientation of the lateral foot-deck ends relative to a horizontal plane; and at least one actuator coupled to the at least one sensor-triggering element, the at least one actuator being manually actuatable by the rider to actuate the at least one sensor-triggering element between the idle position and the triggering position.

12. The actuated accessory as claimed in claim 11, wherein the at least one actuator is coupled to a cable that actuates a corresponding one of the at least one sensor-triggering element.

13. The actuated accessory as claimed in claim 12, wherein the cable is coupled to a positioning member to which the corresponding one of the at least one sensor-triggering element is coupled, wherein tensioning of the cable by the actuator causes the positioning member to pivot to move the corresponding one of the at least one sensor-triggering element from the idle position towards the triggering position.

14. The actuated accessory as claimed in claim 13, wherein the positioning member is biased to pivot to move the corresponding one of the at least one sensor-triggering element towards the idle position.

15. The actuated accessory as claimed in claim 14, wherein the actuator pivots about an actuator pivot axis towards the corresponding one of the at least one control member to tension the cable.

16. The actuated accessory as claimed in claim 15, wherein the cable is coupled to the positioning member via a resiliently deformable member that deforms when the corresponding one of the at least one sensor-triggering element abuts a corresponding one of the at least one sensor and tension is applied to the cable by the actuator.

17. The actuated accessory as claimed in claim 16, wherein the resiliently deformable member comprises a coil spring.

18. The actuated accessory as claimed in claim 11, wherein each of the at least one actuator is lockable so that a corresponding one of the at least one sensor-triggering element is fixed in the triggering position.

* * * * *